US010569875B2

(12) United States Patent
Flood et al.

(10) Patent No.: US 10,569,875 B2
(45) Date of Patent: Feb. 25, 2020

(54) USING UNMANNED AERIAL VEHICLES (UAVS OR DRONES) IN FORESTRY IMAGING AND ASSESSMENT APPLICATIONS

(71) Applicant: Deere & Company, Moline, IL (US)

(72) Inventors: Matthew J. Flood, Dubuque, IA (US); Mark J. Cherney, Dubuque, IA (US); Andrew W. Kahler, Moline, IL (US); Richard Lawler, Dubuque, IA (US)

(73) Assignee: Deere & Company, Moline, IL (US)

( * ) Notice: Subject to any disclaimer, the term of this patent is extended or adjusted under 35 U.S.C. 154(b) by 53 days.

(21) Appl. No.: 15/812,448

(22) Filed: Nov. 14, 2017

(65) Prior Publication Data
US 2019/0102623 A1    Apr. 4, 2019

Related U.S. Application Data

(60) Provisional application No. 62/565,863, filed on Sep. 29, 2017.

(51) Int. Cl.
*G06K 9/00* (2006.01)
*B64C 39/02* (2006.01)
(Continued)

(52) U.S. Cl.
CPC ............ *B64C 39/024* (2013.01); *A01G 23/00* (2013.01); *B64D 47/08* (2013.01); *G01C 9/005* (2013.01);
(Continued)

(58) Field of Classification Search
CPC ............ B64C 39/024; B64C 2201/127; B64C 2201/123; B64C 2201/146;
(Continued)

(56) References Cited

U.S. PATENT DOCUMENTS

| 7,283,156 B1* | 10/2007 | Morgan | F41G 7/001 |
| | | | 340/539.26 |
| 8,849,551 B2* | 9/2014 | Gadler | G01C 21/26 |
| | | | 340/995.19 |

(Continued)

FOREIGN PATENT DOCUMENTS

| SE | 1530146 A1 | 9/2015 |
| WO | 9735433 A1 | 9/1997 |
| WO | 2016049217 A1 | 3/2016 |

OTHER PUBLICATIONS

U.S. Appl. No. 15/812,405, filed Nov. 14, 2017, Office Action dated Aug. 23, 2018, 16 pages.

(Continued)

*Primary Examiner* — Li Liu
(74) *Attorney, Agent, or Firm* — Joseph R. Kelly; Kelly, Holt & Christenson PLLC

(57) ABSTRACT

A method includes controlling an unmanned aerial vehicle to fly over a forestry worksite and capture imagery information with an image capture component. The imagery information is used to generate a set of ground disturbance metrics, each having a value indicative of a measure of ground disturbance at a different geographic location in the forestry worksite. Alternatively, the imagery information is used to generate a set of slope metrics or a firefighting metric. According to the ground disturbance, slope, and firefighting metrics, the method is used to generate an action signal, such as an action signal that controls movement of a mobile machine operating at the forestry worksite, among others.

20 Claims, 16 Drawing Sheets

(51) Int. Cl.
*A01G 23/00* (2006.01)
*B64D 47/08* (2006.01)
*G01C 9/00* (2006.01)
*G01C 21/04* (2006.01)
*G05D 1/00* (2006.01)
*G08G 5/00* (2006.01)

(52) U.S. Cl.
CPC ............ *G01C 21/04* (2013.01); *G05D 1/0022* (2013.01); *G05D 1/0088* (2013.01); *G06K 9/00657* (2013.01); *G08G 5/0034* (2013.01); *B64C 2201/123* (2013.01); *B64C 2201/127* (2013.01); *B64C 2201/146* (2013.01)

(58) Field of Classification Search
CPC ............ B64C 2201/148; G05D 1/0094; G05D 1/0246; G05D 1/104; G05D 2201/0201; G01C 22/006; A01G 23/00; G01S 17/89; G06K 9/0061; G06K 9/0063; G06K 9/00657; G06K 9/00791; G06K 9/52; G06K 9/6267; G06T 2207/30188; G07C 5/008

See application file for complete search history.

(56) References Cited

U.S. PATENT DOCUMENTS

| | | | |
|---|---|---|---|
| 9,129,355 B1* | 9/2015 | Harvey | G06T 7/0008 |
| 9,464,907 B1* | 10/2016 | Hoareau | G01C 21/3632 |
| 10,322,803 B2 | 9/2019 | Flood et al. | |
| 2005/0087110 A1 | 4/2005 | Kobayashi et al. | |
| 2008/0167763 A1* | 7/2008 | Duranti | G05D 1/105 701/11 |
| 2014/0077969 A1 | 3/2014 | Vian et al. | |
| 2014/0163781 A1 | 6/2014 | Vain et al. | |
| 2014/0245210 A1* | 8/2014 | Battcher | G06F 3/04842 715/771 |
| 2015/0019267 A1* | 1/2015 | Prieto | G06Q 10/067 705/4 |
| 2016/0292626 A1 | 10/2016 | Green et al. | |
| 2016/0340842 A1* | 11/2016 | Adams | E01C 23/088 |
| 2016/0360562 A1 | 12/2016 | Chong et al. | |
| 2016/0363932 A1 | 12/2016 | Moriarity et al. | |
| 2017/0031365 A1 | 2/2017 | Sugumaran et al. | |
| 2017/0032509 A1 | 2/2017 | Mannar et al. | |
| 2017/0041978 A1 | 2/2017 | Radhakrishnan | |
| 2017/0059343 A1* | 3/2017 | Spinelli | G01C 21/20 |
| 2017/0103263 A1 | 4/2017 | Prouty et al. | |
| 2017/0161972 A1 | 6/2017 | Moloney et al. | |
| 2017/0193646 A1* | 7/2017 | Wang | B64C 39/024 |
| 2018/0092295 A1* | 4/2018 | Sugumaran | G05D 1/0214 |
| 2018/0102034 A1* | 4/2018 | Liu | G08B 17/005 |
| 2018/0179719 A1* | 6/2018 | Wisley | E02D 1/022 |
| 2018/0196438 A1* | 7/2018 | Newlin | G05D 1/0214 |
| 2018/0292661 A1* | 10/2018 | Songa | G06T 11/60 |
| 2019/0028676 A1 | 1/2019 | Koga et al. | |
| 2019/0096033 A1* | 3/2019 | Taipale | G06K 9/00201 |

OTHER PUBLICATIONS

U.S. Appl. No. 15/812,405, filed Nov. 14, 2017, Notice of Allowance, dated Feb. 19, 2019, 10 pages.

* cited by examiner

USING UNMANNED AERIAL VEHICLES (UAVS OR DRONES) IN FORESTRY IMAGING AND ASSESSMENT APPLICATIONS

CROSS-REFERENCE TO RELATED APPLICATION

The present application is based on and claims the benefit of U.S. provisional patent application Ser. No. 62/565,863, filed Sep. 29, 2017, the content of which is hereby incorporated by reference in its entirety.

FIELD OF THE DESCRIPTION

The present description relates to the use of drones in forestry applications. More specifically, the present description relates to the use of drones in improving performance and data analysis for forestry applications within a variety of worksite operations.

BACKGROUND

There are a wide variety of different types of equipment, such as construction equipment, turf care equipment, agricultural equipment, and forestry equipment. These types of equipment are often operated by an operator and are communicatively connected to other machines.

Forestry equipment can include a wide variety of machines such as harvesters, skidders, feller bunchers, forwarders, and swing machines, among others. Forestry equipment can be operated by an operator, and have many different mechanisms that are controlled by the operator in performing an operation. The equipment may have multiple different mechanical, electrical, hydraulic, pneumatic, electromechanical (and other) subsystems, some or all of which can be controlled, at least to some extent, by the operator.

Current systems may experience difficulty in acquiring information, communicating the acquired information with other machines, and utilizing the acquired information to control machines so as to improve performance of machines to increase productivity measures of forestry operations. These difficulties experienced by current forestry systems can be exacerbated because of the complex nature of forestry operations, including complex terrain and environmental conditions of forestry worksites.

The discussion above is merely provided for general background information and is not intended to be used as an aid in determining the scope of the claimed subject matter.

SUMMARY

A method includes controlling an unmanned aerial vehicle to fly over a forestry worksite and capture imagery information with an image capture component. The imagery information is used to generate a set of ground disturbance metrics, each having a value indicative of a measure of ground disturbance at a different geographic location in the forestry worksite. Alternatively, the imagery information is used to generate a set of slope metrics or a firefighting metric. According to the ground disturbance, slope, and firefighting metrics, the method is used to generate an action signal, such as an action signal that controls movement of a mobile machine operating at the forestry worksite, among others.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
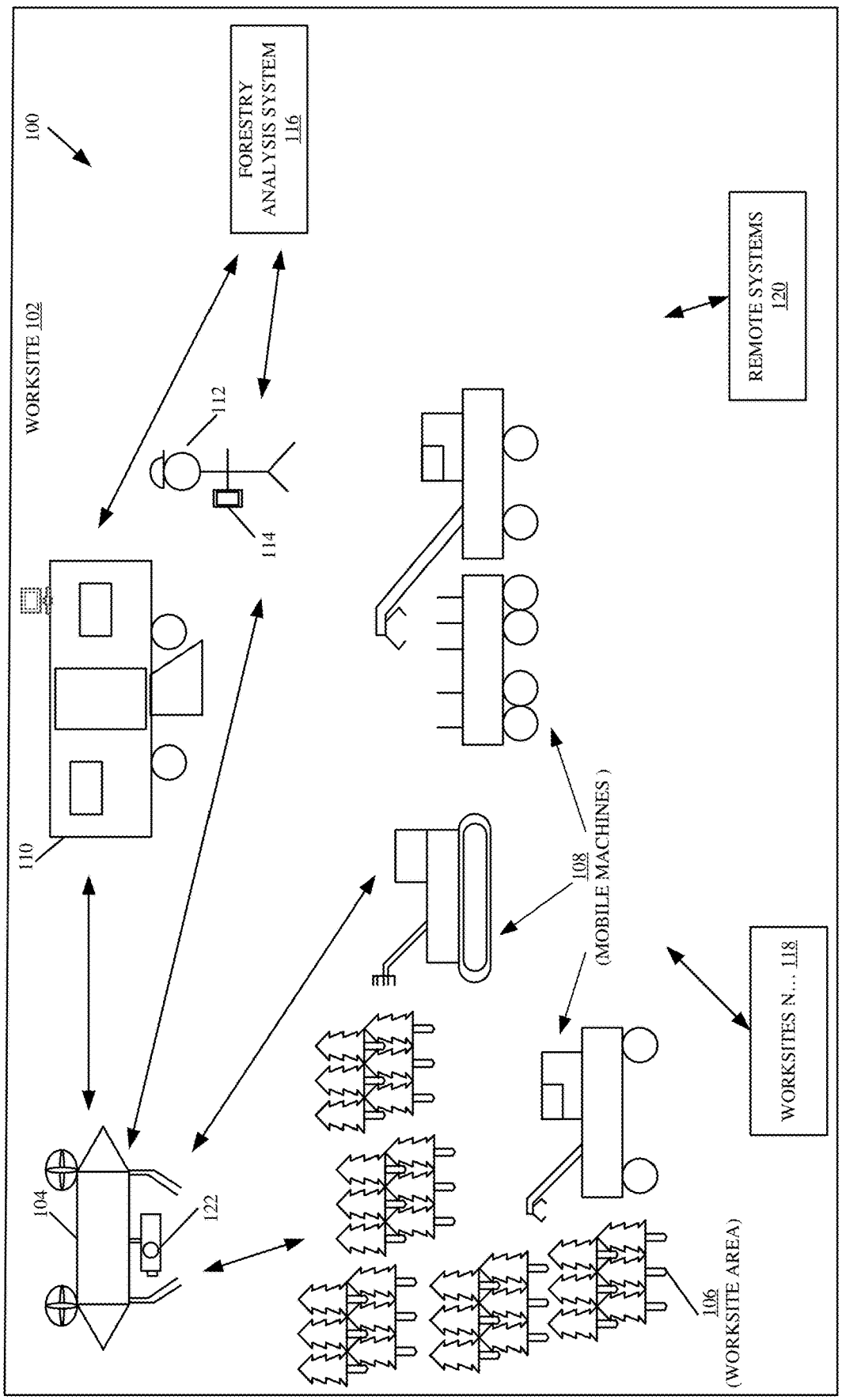
FIG. 1 is a pictorial illustration of a worksite using a forestry analysis system with drones.

A wide variety of different forestry operations can be performed within a worksite. Some example forestry operations include preparing a worksite, gathering information about the worksite, harvesting a planted material, fighting a fire, and repairing damage to the environment, among others. Many such forestry operations utilize machinery that can perform a variety of functions.

Forestry machines (also referred to herein as a machine, a mobile machine, and a vehicle) often have a wide variety of sensors that sense a variety of different variables such as machine operating parameters, worksite characteristics, environmental parameters, etc. Sensor signals are communicated over a controller area network (CAN) bus (or another network, such as an Ethernet network, WiFi etc.) to various systems that process the sensed variables to generate output signals (such as control signals or other outputs) based on the sensed variables.

However, it might be difficult for some current forestry systems to not only obtain accurate and valuable sensed variables, but to also analyze the sensed variables along with other worksite information to produce meaningful results. Further, it might be difficult for some systems to use the analyzed information to improve worksite productivity. There are a variety of different factors that can exacerbate this difficulty for forestry operations.

One particular factor that makes it especially difficult for some current forestry systems to obtain and utilize information is the widely varying characteristics of forestry worksites themselves. For example, forestry worksites often have characteristics such as a high density of trees and other vegetation, large differences in topology such as steep, naturally-occurring slopes, and areas of ruts or soil erosion (e.g., large ruts produced by operation of heavy machinery). Also, forestry worksites are often large, spanning hundreds or thousands of acres. These and other forestry worksite characteristics make it difficult for land vehicles to traverse the area when performing an operation or otherwise attempting to obtain valuable information for the worksite.

To further illustrate these difficulties, a brief overview of several example forestry operations will be provided below. A forestry harvesting operation, for example, can be difficult when a feller buncher is operating parallel to a steep slope and experiences a loss of traction. In such a situation, it might be valuable to obtain and analyze worksite slope information that can be used to better control the feller buncher and reduce slippage experienced by the vehicle. As another example, a feller buncher might be less productive (e.g., take more time to harvest an area) if it starts harvesting at an area having a high density of tree population, compared to if it starts harvesting at an area of less density. Similarly, a machine might have difficulty traversing a worksite or efficiently performing an operation if it follows a travel route over laid trees (e.g., cut trees that have not been moved from the worksite area and are laying on the ground). Thus, it might be valuable for forestry systems to obtain and utilize tree inventory information as well as worksite productivity information such as the level of completeness of specific worksite areas.

In another example situation, a contractor might remove machines from the worksite when a harvesting or other operation is complete. However, the worksite might have damage from the machines that is not easily detected in some current systems. In this example, machines will then be transported back to the worksite (to repair the damage), which costs the contractor time and money. In view of this, it might be beneficial to obtain and utilize information about ground disturbance caused by the machines.

It might also be difficult for some current systems to determine whether a forest fire within a worksite is worth fighting. For instance, characteristics of the environment in and around the worksite such as insect habitation and information about the feasibility of performing a fire fighting operation may bear on whether the fire should be fought at that location. This type of information can be valuable in making fire fighting decisions.

Another factor that makes it especially difficult for some current forestry systems to obtain and utilize information is the geographic location of forestry worksites themselves. Forestry worksites are often located in remote areas, distant from populated cities or towns, and are therefore remote from cellular connectivity towers or other communication stations. Because of this, it can be especially difficult to collect and share valuable data for the worksite. For example, it can be difficult to obtain valuable information (e.g., sensor information) from machines operating on the ground. Once the information is obtained from the machines, it can also be difficult to forward the data to an analysis service or storage location (e.g., a cloud storage service provider via a satellite connection), or otherwise provide an operator with the data. That is, even if the information is obtained, some current systems face difficulties in providing the data to a system for analysis such that the analyzed data can be used to assist an operator, for instance, in making management decisions for the forestry worksite.

An additional factor that makes it especially difficult for some current forestry systems to obtain and utilize information to improve productivity is the complex nature of the control operations needed to operate a machine. For example, it might be beneficial for some control operations to be automated or semi-automated processes that are generated by considering information about, for example, the worksite, the machine, and the environment. These complications can make it very difficult to optimize performance of forestry machines for improving productivity of a forestry worksite operation.

To address at least some of these and other difficulties faced within forestry worksites, the present description provides a forestry analysis system. As will be discussed in further detail below, one example forestry analysis system addresses these challenges by controlling an unmanned aerial vehicle (UAV) to obtain images of a worksite along with other valuable information (e.g., machine-specific sensor information), such that the forestry analysis system can generate outputs, based on the images and other information, to control machines or otherwise influence operations within the worksite.

FIG. 1 is a pictorial illustration 100 of a worksite 102 having a worksite area 106 that includes one or more mobile machine(s) 108 operating to perform one or more forestry operations. FIG. 1 illustratively shows that UAV 104 includes an image capture component 122. UAV 104 travels along a flight path within worksite 102 and uses image capture component 122 (and other sensors) to capture images (and other sensor information). Image capture component 122 can capture information indicative of worksite area 106 and mobile machines 108. UAV 104 is also configured to communicate with mobile machines 108 to obtain sensor information sensed by sensors positioned on each of the machines (e.g., machine-specific sensor information). Once UAV 104 has obtained the imaging information and/or the machine-specific sensor information, UAV 104 can communicate with a communication station 110 and a communication device 114 to store the information and forward the information to a forestry analysis system 116. Forestry analysis system 116 receives the information and is generally configured to perform data analysis on the information. Based on the analyses performed, forestry analysis system 116 generates outputs that can control communication device 114, communication station 110, UAV 104, and mobile machine 108, or otherwise represent the analyzed information, such as by generating a user interface for interaction by operator 112. Worksite 102 also illustratively includes additional worksites 118 and one or more additional remote systems 120.

Figure 2A:
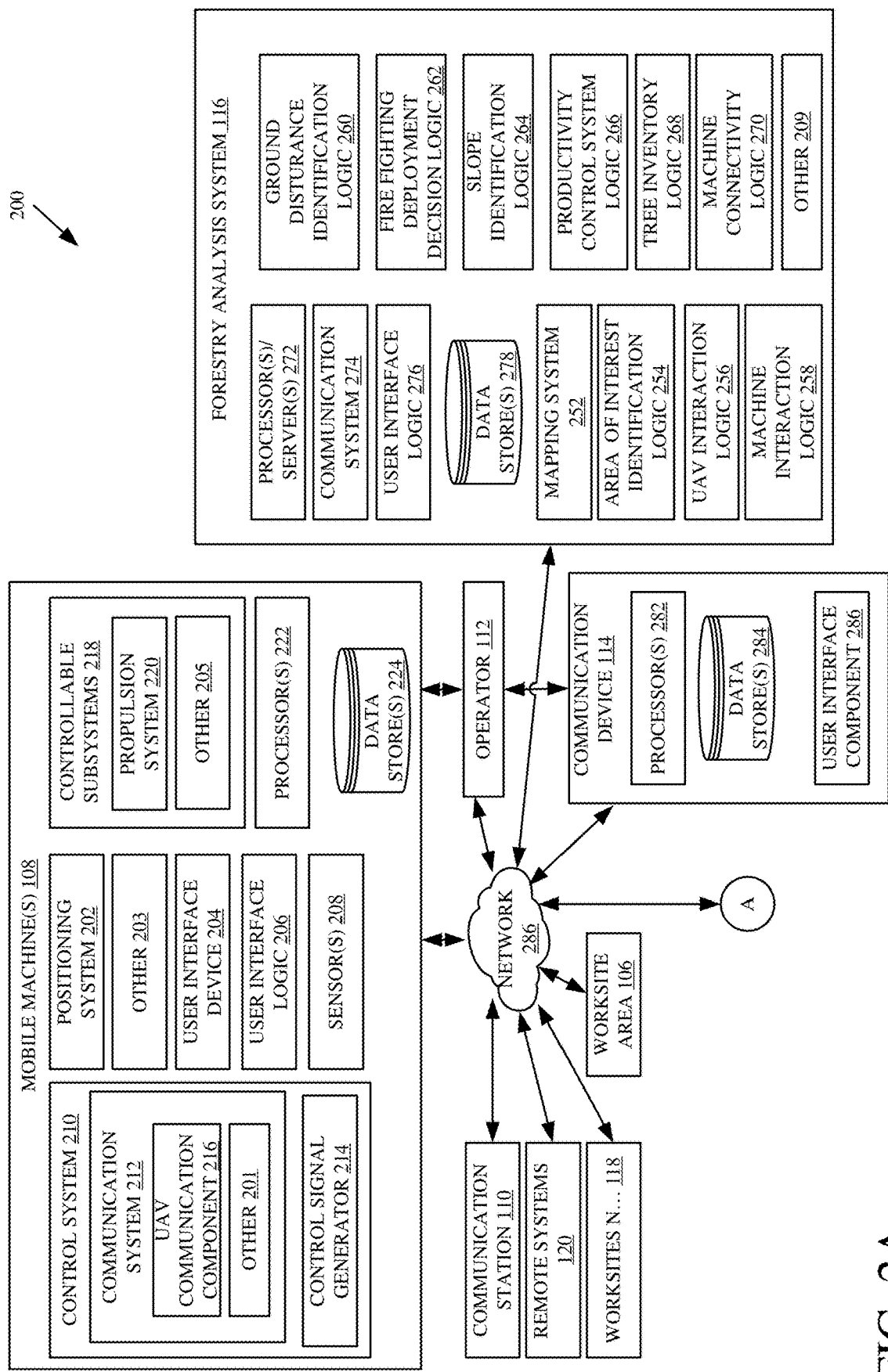
FIGS. 2A and 2B (collectively referred to herein as FIG. 2) show a block diagram of one example of a computing architecture that includes the forestry analysis system illustrated in FIG. 1.
Figure 2B:
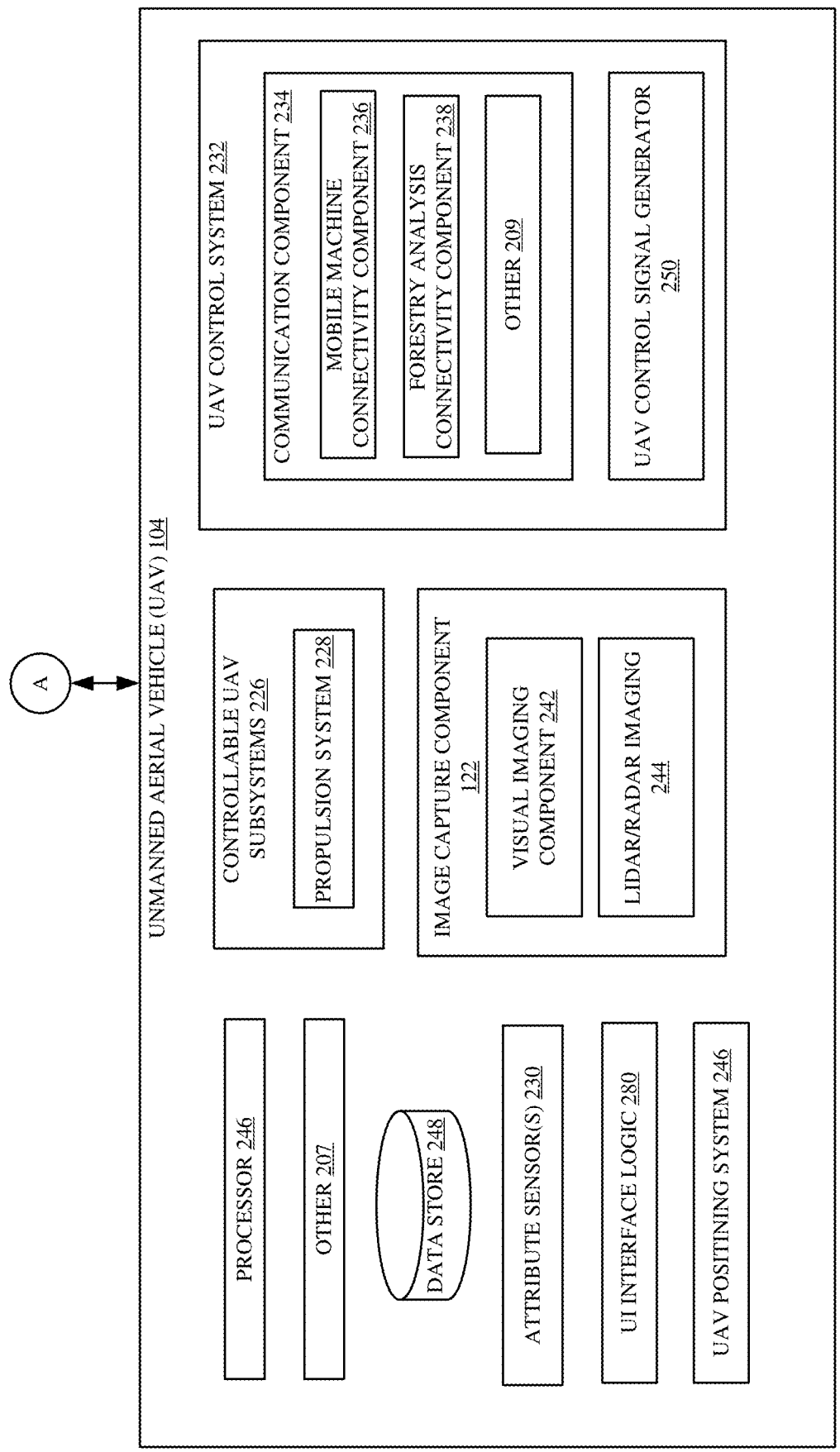

FIGS. 2A and 2B (collectively referred to herein as FIG. 2) show a block diagram of one example of a forestry computing architecture 200 that includes forestry analysis system 116 illustrated in FIG. 1. Prior to discussing the features of UAV 104 and forestry analysis system 116 in further detail, a brief overview of the other features illustrated in FIG. 2 will be provided.

FIG. 2 illustratively shows that mobile machine(s) 108, UAV system 104 (hereinafter UAV, UAV system), forestry analysis system 116, communication station 110, remote systems 120, worksites 118, worksite area 106, and communication device 114, among other components 248, are connected by network 286. Thus, forestry computing architecture operates in a networked environment, where network 286 includes any of a wide variety of different logical connections such as a local area network (LAN), wide area network (WAN), near field communication network, satellite communication network, cellular networks, or a wide variety of networks or combination of networks.

Communication device 114 illustratively includes one or more processor(s) 282, one or more data store(s) 284, and a user interface component 286. User interface component 286 is configured to generate user interfaces on a display screen, the user interfaces having user input mechanisms for detecting user interaction by operator 112. In one example, communication device 114 includes a tablet computing device or a laptop computing device, or any of the other devices discussed with respect to FIGS. 11-13 below.

FIG. 2 illustratively shows that mobile machine 108 (hereinafter mobile machine, machine, or forestry machine) includes a positioning system 202, a user interface device 204, user interface logic 206, one or more sensors 208, a control system 210 including a communication system 212 and a control signal generator 214, controllable subsystems 218 including a propulsion system 220, one or more processors 222, one or more data stores 224, and other mobile machine components 203. While the present description will primarily focus on an example in which mobile machine 108 includes a forestry machine that performs forestry operations, it is noted that mobile machine 108 can include any of a wide variety of different machines.

In one example, mobile machine 108 uses user interface logic 206 to generate operator interface displays having user input mechanisms for display output on a user interface device 204 and for interaction by operator 112. Operator 112 can be a local operator of mobile machine 108 in an operator's compartment of mobile machine 108, and can interact with user input mechanisms to control and manipulate mobile machine 108. Operator 112 can also be a remote operator of mobile machine 108, interacting with mobile machine 108, for example, via communication device 114 over network 286. User input mechanisms can include one or more display devices (e.g., user interface device 204), one or more audio devices, one or more haptic devices, and other items, such as a steering wheel, joysticks, pedals, levers, buttons, keypads, etc.

Sensor(s) 208 can generate a wide variety of different sensor signals representing a wide variety of different sensed variables. For instance, sensor(s) 208 generate signals indicative of slope angle, soil moisture, proximity, acceleration, hydraulic actuator movement or position, a geographic location (e.g., where sensors 208 include a global positioning system (GPS) receiver or other positioning system), among others.

Positioning system 202 illustratively generates one or more signals indicative of a position of mobile machine 108 at any given time during an operation. Generally, positioning system 202 receives sensor signals from one or more sensor(s) 208, such as a GPS receiver, a dead reckoning system, a LORAN system, or a wide variety of other systems or sensors, to determine a position of mobile machine 108 across a worksite. Positioning system 202 can also access data store 224 to retrieve stored positioning information that indicates positions of mobile machine 108 in performing historical operations, as well as the paths and/or patterns of travel of mobile machine 108 during performance of the historical operations.

Control system 210 includes communication system 212, which illustratively includes UAV communication component 216 among a wide variety of other communication components 201, and is generally configured to allow mobile machine 108 to communicate with remote systems including a remote analytics computing system, such forestry analysis system 116, a remote manager computing system, communication device 114, mobile machine 108, remote systems 120, among others. Thus, communication system 212 illustratively communicates over communication networks discussed above. In one example, UAV communication component 216 is configured to communicate with UAV 104 over a wireless local area networking such as WiFi. Control signal generator 214 generates control signals for controlling a variety of different controllable subsystems 218 based on sensor signals generated by sensor(s) 208, based on information received through communication system 212 (e.g., information received from forestry analysis system 116), based on user inputs received through user input mechanisms detected via user interface logic 206, based on positioning information obtained from positioning system 202, and/or it can generate control signals in a wide variety of other ways as well.

Controllable subsystems 218 illustratively include propulsion system 220 among a wide variety of other controllable subsystems 205, such as a grapple, circular saw or shear, hydraulic implements, etc. Propulsion system 220 generally includes an engine that drives ground engaging wheels or tracks via a powertrain mechanism.

FIG. 2 further illustratively shows that UAV 104 includes controllable UAV subsystems 226 having a propulsion system 228, one or more attribute sensor(s) 230, a UAV control system 232 having a communication component 234 and a UAV control signal generator 250, a UAV positioning system 240, image capture component 122 having a visual imaging component 242 and a light detection and ranging (LIDAR)/Radar imaging component 244, user interface logic 280, one or more processors 246, one or more data stores 248, and a wide variety of other UAV components 207.

Attribute sensors 230 can generate a wide variety of different sensor signals representing a wide variety of different sensed variables regarding UAV 108. For instance, attribute sensors 230 can generate signals indicative of acceleration and orientation of UAV 108. Attribute sensors 230 can include, as an example only, but not by limitation, range finders, inertial navigation systems, payload sensors, etc.

UAV positioning system 240 can include logic and illustratively generates one or more signals indicative of a position of UAV 104 at any given time during an operation. Generally, UAV positioning system 240 receives sensor signals from one or more attribute sensor(s) 230, such as a global positioning system (GPS) receiver, a dead reckoning system, a LORAN system, range finder, inertial navigation system, laser range finder, or image capture component 122, or a wide variety of other systems or sensors, to determine positions of UAV 104 across a worksite. UAV positioning system 240 can also access data store 248 to retrieve stored positioning information that indicates positions of UAV 104 in performing historical operations, as well as the flight paths and/or patterns of flight of UAV 104 during performance of the historical operations.

UAV control system 232 can include communication component 234, which illustratively includes a mobile machine connectivity component 236 and a forestry analysis connectivity component 238, among other components 209. Communication component 234 is generally configured to allow UAV 104 to communicate with mobile machines 108, remote systems including a remote analytics computing system such forestry analysis system 116, a remote manager computing system, communication device 114, communication station 110, as well as other remote systems 120, among others. Mobile machine connectivity component 236, for example, establishes a secure connection and communicates directly with UAV communication component 216 of mobile machine 108, and is thus configured to communicate with mobile machine 108 over WiFi or other communication networks such as a near field communication network. Thus, UAV 104 can transmit and receive data and other information from mobile machine 108 via mobile machine connectivity component 236.

Forestry analysis connectivity component 238, for example, establishes a secure connection and communicates with forestry analysis system 116 through communication device 114, communication station 110, or a variety of other communication devices or interfaces. Thus, UAV 104 transmits and receives data and other information from forestry analysis system 116 via forestry analysis connectivity component 238. As will be discussed in further detail below, UAV 104 transmits information, such as data obtained from sensors 208 or machine 108, as well as attribute sensors 230, image capture component 122, or UAV 104, to forestry analysis system 116. UAV 104 also receives output information such as productivity measures from forestry analysis system 116. This communication architecture can be especially useful in examples where forestry analysis system 116 is a remote cloud computing service requiring communication via a satellite connection.

UAV control system 232 also illustratively includes UAV control signal generator 250 that generates control signals for controlling a variety of different controllable UAV subsystems 226. This can be done based on sensor signals generated by attribute sensors 230, based on information received through communication component 238, based upon user inputs received through user input mechanisms detected via user interface logic 280 (e.g., user inputs provided from communication device 114, as will be discussed in further detail below), or it can generate control signals in a wide variety of other ways as well.

Controllable UAV subsystems 226 illustratively include propulsion system 228 among a wide variety of other controllable systems. Propulsion system 228 generally includes a motor that drives one or more propellers or turbines (among others) to generate lift and to propel UAV 104 along a flight path.

Image capture component 122 is configured to obtain images or other sensor information indicative of a wide variety of different items in worksite area 106. For example, image capture component 122 can identify worksite area 106 and capture images that indicate a wide variety of different worksite characteristics and/or properties such as, but not limited to, particular areas of interest, trees, tree properties, ground surface properties, ground surface and tree top topography, insect habitation, etc.

Specifically, in one example, visual imaging component 242 can include any of a wide variety of different digital still cameras or video cameras that capture high resolution digital representations of worksite area 106. LIDAR/radar imaging component 244 scans worksite area 106 with pulsed laser light and measures the reflected pulses with one or more sensors to generate a series of data representations that indicate a model of the landscape. This can be used for generating, for example, a three-dimensional model of worksite area 106. Visual imaging component 242 and LIDAR/radar imaging component 244 can also capture information indicative of a location of mobile machines 108, communication station 110, operator 112, communication device 114, and/or other machines or items of interest positioned in worksite 102.

FIG. 2 illustratively shows that forestry analysis system 116 includes a mapping system 252, area of interest identification logic 254, UAV interaction logic 256, machine interaction logic 258, ground disturbance identification logic 260, fire-fighting deployment decision logic 262, slope identification logic 264, productivity control system logic 260, tree inventory logic 268, machine connectivity logic 270, one or more processors and/or servers 272, a communication system 274, user interface logic 276, and one or more data stores 278, among a wide variety of other components 209. Again, before describing the operation of the entire architecture in more detail, a brief description of some of the items on forestry analysis system 116 will first be provided.

Communication system 274 allows forestry analysis system 116 to communicate with a remote manager computing system. This can be done using communication device 114, UAV 104, mobile machines 108, communication station 110, and remote systems 120, among others. Communication system 274 communicates over communication networks discussed above. In one example, forestry analysis system 116 is remote from mobile machines 108, UAV 104, communication station 110, communication device 114, and the other features of computing system architecture 200. For instance, it may be implemented as a computing service that receives information, obtained by mobile machines 108 and/or UAV system 104, via communication station 110 and/or communication device 114.

Generally, forestry analysis system 116 is configured to receive a wide variety of information, such as information indicative of characteristics and properties of worksite area 106 as well as information indicative of performance of a forestry operation. This information can be captured by UAV system 104 (such as information captured by using image capture component 122) or it can be captured by machine 108. As will be further detailed with respect to FIGS. 3A and 3B, forestry analysis system 116 performs a wide variety of different data analyses on the information to generate outputs. The outputs generated by forestry analysis system 116 can be provided to any of the systems discussed with respect to forestry computing architecture 200.

Figure 3A:
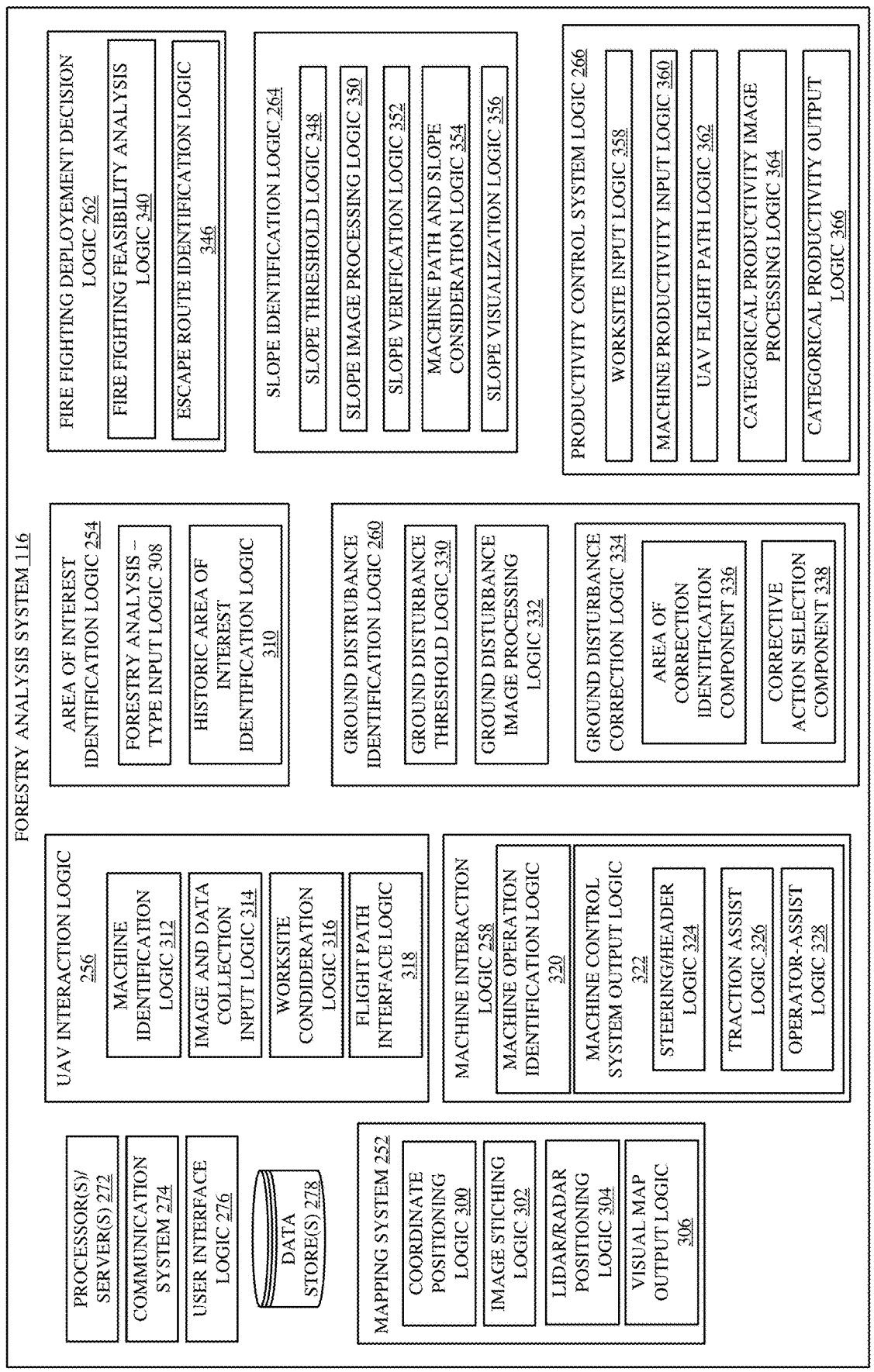
FIG. 3A is a block diagram of one example of a portion of the forestry analysis system illustrated in FIG. 1 in further detail.
Figure 3B:
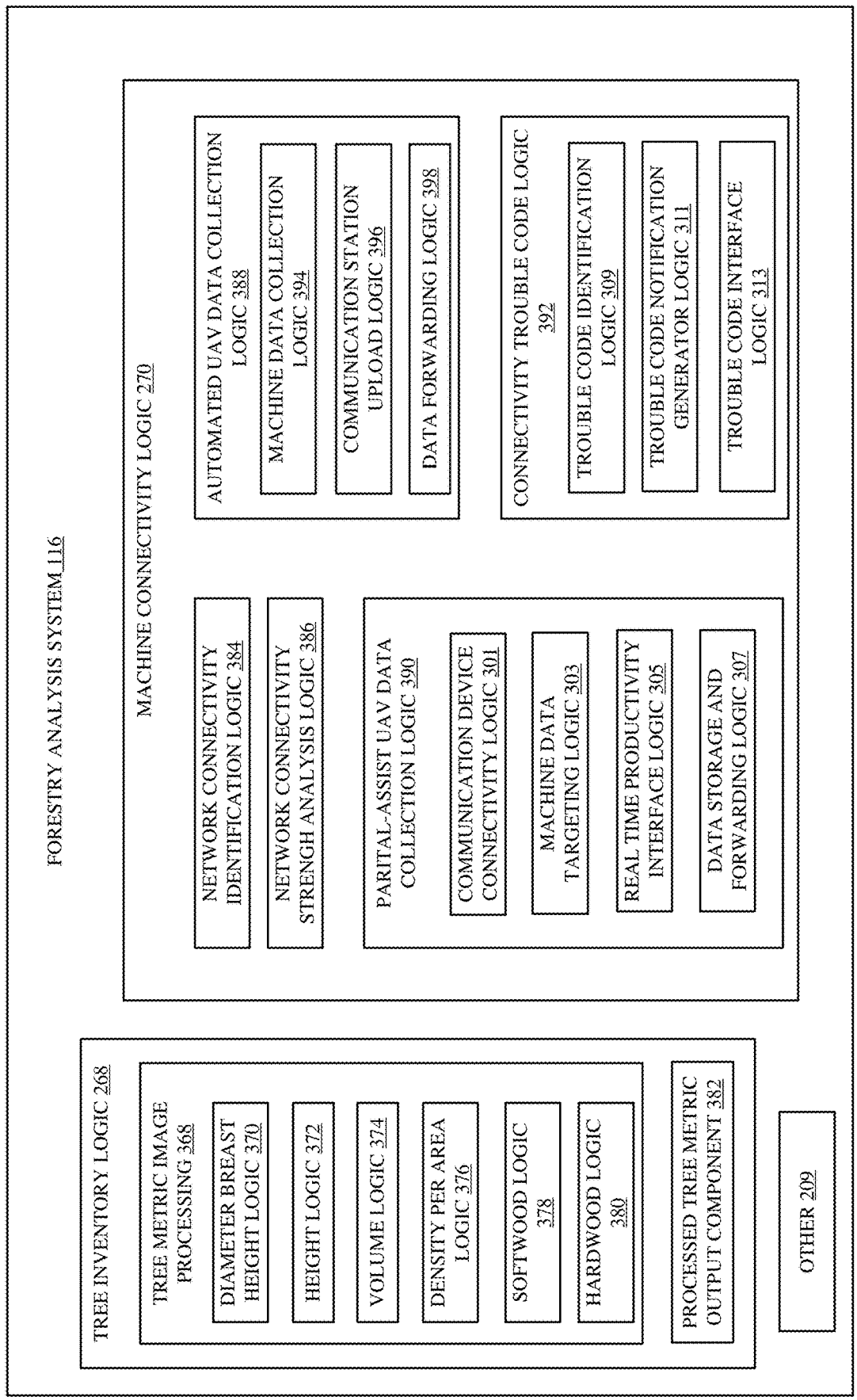
FIG. 3B is a block diagram of one example of a portion of the forestry analysis system illustrated in FIG. 1 in further detail.

FIGS. 3A and 3B are block diagrams of one example of forestry analysis system 116 illustrated in FIG. 1 in further detail. FIGS. 3A and 3B will now be discussed in conjunction with one another.

Mapping system 252 illustratively includes coordinate positioning logic 300, image stitching logic 302, LIDAR/radar positioning logic 304, and visual map output logic 306. Mapping system 252 generally obtains the images captured by UAV 104 information regarding various positions of worksite 102, such as the various positions of UAV 104 as it travels along a flight path within worksite area 106 or positions of mobile machine 108. Based on the position information, mapping system 252 generates a mapped representation of worksite 102 (e.g., worksite area 106). That representation can be stored at data store 278, accessed for correlating sensed information or image information to a real-world location within worksite 102, and utilized to generate a visual representation of worksite 102. The visual representation can be output, for example, to interfaces displayed on user interface device 204 or user interface component 286 for interaction by operator 112.

Coordinate positioning logic 300 receives or otherwise accesses positioning information from any of positioning system 202 and UAV positioning system 240. In one example, coordinate positioning logic 300 generates a data structure that retains coordinate positions, such as latitude and longitude, corresponding to sensor or image information received for a forestry operation.

Image stitching logic 302 receives or otherwise accesses images captured by visual imaging component 242 and combines the images into a spatial representation of worksite area 106. For example, image stitching logic 302 stitches images captured by UAV 104 into a digital image model of worksite area 106 based on the image information itself and a corresponding coordinate data structure generated by coordinate positioning logic 300. LIDAR/radar stitching logic 304 can receive or otherwise access distance data points scanned or otherwise detected by LIDAR/radar imaging component 244. LIDAR/radar stitching logic 304 can generate a three-dimensional point cloud model or other data point model representation of worksite area 106 based on the distance data points. LIDAR/radar stitching logic 304 utilizes a corresponding coordinate data structure, generated by coordinate positioning logic 300, to generate the point cloud model as a representation of worksite area 106.

Visual map output logic 306 generates a visual map that represents worksite area 106 with high detail. For example, a visual map generated by visual map output logic 306 can illustratively identify a machine rut in a worksite within several centimeters of accuracy. Visual map output logic 306 generates a visual map based on any of a coordinate data structure generated by coordinate positioning logic 300, a digital image model generated by image stitching logic 302, and/or a data point model generated by LIDAR/radar stitching logic 304. The visual map generated by visual map output logic 306 can be rendered for display on a device such as user interface component 286 and user interface device 204.

In addition, in one example, visual map output logic 306 can use analysis results generated by forestry analysis system 116 to include visual indications of the analysis results within a rendered visual map. For instance, in an example where forestry analysis system 116 generates a planned travel route for machine 108, visual map output logic 306 generates a visual representation of the planned path as it corresponds to real-world locations represented on the display of the visual map.

Area of interest identification logic 254 illustratively includes forestry analysis-type input logic 308 and historic area of interest identification logic 310. Area of interest identification logic 254 identifies one or more areas of interest within worksite 102. For example, area of interest identification logic 254 can identify worksite area 106 as an area within worksite 102 that is of particular interest to a current operation being performed. Forestry analysis-type input logic 308 can identify a current analysis to be performed by forestry analysis system 116 and accordingly select an area of interest for that assessment. For example, forestry-analysis type input logic 308 identifies a ground disturbance assessment to be performed. Forestry analysis-type input logic 308 can identify the assessment to be performed based on an indication of a user input that selects an analysis, automatically based on obtained information, or in a variety of other ways as well.

Once the type of assessment to be performed is identified, forestry analysis-type input logic 308 identifies a particular area within worksite 102, such as worksite area 106, for which logic (e.g., disturbance identification logic 330) is to perform the assessment. Accordingly, forestry-analysis type input logic 308 also identifies data obtained for worksite area 106 as being relevant to the assessment. It can do this by accessing a mapped representation of worksite 106 generated by mapping system 252, and providing an indication of the relevant data to ground disturbance identification logic 330. Of course, it is noted that forestry-analysis type input logic 308 can include other features, such as identifying a series or workflow of assessments to be performed or identifying an entire boundary of worksite area 102, among others.

Historic area of interest identification logic 310 is configured to access information pertaining to prior assessments performed on worksite 102 (e.g., historical analysis information stored in association with data store 278) and identify relationships between particular areas within worksite 102 and the prior operations performed for each area, respectively.

UAV interaction logic 256 interacts with UAV 104 in a wide variety of different ways for facilitating transfer of information between UAV 104 and forestry analysis system 116. UAV interaction logic 256 illustratively includes machine identification logic 312, image and data collection input logic 314, worksite consideration logic 316, and flight path interface logic 318. Machine identification logic 312 identifies a wide variety of machines in worksite 102 and provides UAV 104 with instructions to utilize a unique machine identification code for communicating information with a particular machine. Machine identification logic 312 can generate information that can be used by UAV 104 to communicate with forestry analysis system 116, a particular mobile machine 108, a particular communication station 110, etc. It can do this by providing a unique identification code for the machine or system that UAV 104 is to communicate with, or along with geolocation information associated with the unique identification code.

Image and data collection input logic 314 generates instructions that indicate to UAV 104 the particular type of information it is to collect. For instance, it may instruct UAV 104 to collect data or one or more images for an analysis to be performed by forestry analysis system 116. In one example, image and data collection input logic 314 may instruct UAV 104 to collect information, such as machine-specific sensor information from machine 108 (e.g., by identifying the relevant machine in worksite area 106 with machine identification logic 312) and digital images or distance point data for worksite area 106. These are examples only.

Worksite consideration logic 316 considers a wide variety of information regarding worksite area 102 to generate or modify instructions for collecting information with UAV 104. In one example, worksite consideration logic 316 interacts with area of interest identification logic 254 to receive an indication of a particular worksite (e.g., worksite area 106) for which an analysis is to be performed, and based on this indication, generates instructions that instruct UAV 104 to fly and obtain data based on geographical information for worksite area 106. For example, worksite consideration logic 316 can generate instructions that instruct UAV 104 to use input values regarding worksite boundaries, tree height, machine deployment, resource allocation, etc. when performing a data collection operation for a particular analysis being performed.

Flight path interface logic 318 generates flight path instructions that instruct UAV 104 to travel along a defined aerial path to perform data collection and sharing operations, according to a particular analysis to be performed. For example, flight path interface logic 318 may generate a first set of instructions that specify a first flight path for UAV 104 to travel in collecting information corresponding to a ground disturbance assessment, and generate a second set of instructions that specify a second flight path for UAV 104 to travel in collecting information corresponding to a slope assessment.

Machine interaction logic 258 interacts with mobile machine 108 in a wide variety of different ways for facilitating control of mobile machine 108 according to analysis results obtained by forestry analysis system 116. Machine interaction logic 258 illustratively includes machine operation identification logic 320, and machine control system output logic 322 having steering and header logic 324, traction assist logic 326, and operator-assist logic 328. It can have a wide variety of other items as well.

Machine operation identification logic 320 receives data obtained for analysis by forestry analysis system 116 and identifies an operation, performed by machine 108, corresponding to the data. For example, machine operation identification logic 320 receives indications of sensor data, obtained by machine 108, indicating soil moisture content and identifies that the sensor data was obtained during performance of a harvesting operation by machine 108.

Results of analyses performed at forestry analysis system 116 can be provided to machine control system output logic 322. Machine control system output logic 322 receives analysis results or other indications of an analysis (e.g., indication of an output signal generated by an analysis) and uses the results to generate output signals that are provided to machine 108. Steering and header logic 324, for example, generates an output control signal that instructs mobile machine 108 to adjust steering parameters or a heading setting and thereby control directional travel of mobile machine 108. This information can be displayed to assist in operator control of machine 108 or it can be used to control machine 108 automatically. For instance, based on a slope assessment, steering and header logic 324 can generate instructions used to move machine 108 to a directional heading that allows machine 108 to perform a current harvesting operation along a less steep slope. Steering and header logic 324 can generate control signals that are provided to machine 108 to automatically move machine 108, given the directional heading.

Traction assist logic 326 obtains analysis results and generates instructions that control machine 108 to use traction assist mechanisms. For example, based on receiving analysis information indicating a steep slope, traction assist logic 326 can generate instructions used to automatically use traction-assist equipment or to perform traction-assist techniques with mobile machine 108.

Operator-assist logic 328 can identify whether machine 108 is operating under full or partial operator 112 control or whether it is operating independently of operator 112 (e.g., it can identify whether machine 108 is operating in a fully manual mode, a partial autonomous mode, or a fully autonomous mode). It can also generate instructions, based on analysis information, that provide information specifically useful to operator 112 for controlling machine 108. In an example where analysis information is used to update a travel route prescribed for mobile machine 108, operator-assist logic 328 can generate instructions to provide indications to operator 112 to move machine 108 accordingly (e.g., the instructions can be used to generate user interface notifications with user interface logic 206 that show operator 112 a suggested travel path).

Tree inventory logic 268 is configured to analyze information obtained by image capture component 122 to determine characteristics of a tree population within worksite area 106. Tree inventory logic 268 illustratively includes tree metric image processing logic 368 and processed tree metric output component 382. Tree metric image processing logic 368 can measure a wide variety of tree properties for trees in worksite area 106, based on visual data obtained by visual imaging component 242 and/or LIDAR/radar imaging component 244. For example, tree metric image processing logic 368 can determine a wide variety of metrics, such as an average, mean, deviation, or other statistical metric, corresponding to a measured tree property value for trees in worksite area 106. Tree metric image processing logic 368 illustratively includes diameter breast height logic 370 that can determine metrics indicative of a measured tree diameter at breast height. Height logic 372 can determine metrics indicative of a measured tree height. Volume logic 374 can determine metrics indicative of a measured volume of a tree population. Density per area logic 376 can determine metrics indicative of a density of trees per worksite area 106. Softwood logic 378 can determine metrics indicative of areas of softwood (e.g., conifer) trees. Hardwood logic 380 can determine metrics indicative of areas of hardwood (e.g., deciduous) trees.

Processed tree metric output component 382 can generate output signals indicating any of the determined tree metrics, as well as an action signal. For example, processed tree metric output component 382 can generate an output that is provided to user interface component 286 and/or user interface device 204 to inform operator 112 of the determined tree metrics for worksite area 106. For instance, worksite area 106 can be visualized, according to functionality of mapping system 252 discussed above, to incorporate visual representations of tree metrics on a generated map. An action signal generated by processed tree metric output component 382 can, for example, include machine deployment signals to control deployment of a forestry machine at worksite area 106, or at specific geographic locations based on the tree inventory metrics.

Ground disturbance identification logic 260 is generally configured to analyze any of machine-specific information and/or image information captured by image capture component 122 to perform a ground disturbance assessment. "Ground disturbance" as used herein can refer to any deviation in ground surface properties, such as soil erosion, rut formation, material overlaying the ground surface, etc. Particularly, "ground disturbance" can refer to these and other deviations from naturally occurring ground surface properties that are caused by the operation of machinery within worksite 102. Ground disturbance identification logic 260 illustratively includes ground disturbance threshold logic 330, ground disturbance image processing logic 332, and ground disturbance correction logic 334 having area of correction identification component 336 and corrective action selection component 338. Ground disturbance threshold logic 330 generates a threshold value of ground disturbance. A threshold value of ground disturbance can include, for example, but not by limitation, a level of soil erosion, a measure of rut depth, a measure of amount of material (e.g., cut trees, leaves, other material) overlaying a ground surface, among a wide variety of others. Ground disturbance image processing logic 332 uses one or more sets of rules to process images obtained by image capture component 122 (e.g., and/or information processed by mapping system 252) to generate a mapping of the determined ground disturbance for worksite area 106, and identify particular sub-areas within worksite area 106 having a level of ground disturbance that exceeds the threshold value of ground disturbance. For example, ground disturbance image processing logic 332 can identify a machine rut located within worksite area 106 and having a depth greater than a threshold machine rut depth. Thus, ground disturbance image processing logic 332 can generate a set of ground disturbance metrics, each having a value indicative of a ground disturbance at a different geographic location, based on the imagery information. From the imagery information, a given location that has a ground disturbance indicator indicative of likely ground disturbance can be identified. The value of the ground disturbance metric might include a difference in a smoothness of the ground at the geographical location, relative to a smoothness of the ground at other, proximate locations.

Area of correction identification component 336 includes logic that identifies an area, such as a geographical area surrounding the machine rut, to be operated on by mobile machine 108 for correcting the disturbed ground. Corrective action selection component 338 selects a particular corrective action, from a plurality of available corrective actions, to be implemented by machine 108 for correcting the disturbed ground at the identified area of worksite area 106. In one example, a corrective action includes obtaining and delivering additional soil to the identified area, as well as smoothing the ground surface of soil with mobile machine 108. Ground disturbance correction logic 334 can thus be utilized to generate instructions, such as an action signal, for automatically, semi-automatically, or manually controlling mobile machine 108 to perform an operation that reduces or otherwise mediates undesired disturbance of a ground surface in worksite area 106 (e.g., at the location of identified ground disturbance), based on the ground disturbance metrics.

Slope identification logic 264 is configured to analyze any of machine-specific information and/or image information captured by image capture component 122 to perform a slope identification assessment for worksite 102. Slope identification logic 264 illustratively includes slope threshold logic 348, slope image processing logic 350, slope verification logic 352, machine path and slope consideration logic 354, and slope visualization logic 356. Slope threshold logic 348 generates a threshold value of ground slope. A threshold value of ground slope can include, for example, but not by limitation, a ratio of vertical rise to horizontal run, an angle of ground surface, or any other value that can be compared to a sensed or otherwise obtained measure of slope (e.g., gradient or pitch) of worksite area 106. Slope image processing logic 350 one or more sets of rules to process images obtained by image capture component 122, and/or information processed by mapping system 252, to identify particular sub-areas within worksite area 106 having a slope that exceeds the threshold value of slope. Slope image processing logic 350 can generate a set of slope metrics, each having a value indicative of a measure of slope at a different location in the forestry worksite, based on the imagery information. For example, slope image processing logic 350 can identify a slope within worksite area 106 having an angle greater than 12 degrees. Slope verification logic 352 is configured to verify a measured slope by performing a verification analysis. For example, machine 108 utilizes one or more sensors 208 to sense a slope of worksite area 106. Slope verification logic 352 obtains slope sensor signals and measures a slope value for worksite area 106, based on the slope sensor signals. Slope verification logic 352 compares the measured slope value to an identified slope, as identified by slope image processing logic 250. Slope verification logic 352 can thus be utilized to verify and/or calibrate the aerial image processing operations performed by slope image processing logic 350 by utilizing comparisons against slope data sensed by sensors 208 on machines 108 operating on the ground.

Machine path and slope consideration logic 354 uses slope measurements obtained by slope identification logic 264 to generate instructions, such as an action signal, that can update or otherwise control a prescribed machine path. For example, where a particular sub-area within worksite area 106 has been identified as having a slope that exceeds the threshold value of slope, machine path and slope consideration logic 354 can first determine that a prescribed travel route of machine 108 includes travel over or within that sub-area. Machine path and slope consideration logic 354 can then instruct machine interaction logic 258 to provide an output or control signal to machine 108 for avoiding the particular sub-area with the steep slope. Thus, machine path and slope consideration logic 354 can control communication logic to communicate the route signal to machine 108.

Slope visualization logic 356 can generate a visual representation of measured slope data. For example, slope visualization logic 356 can generate a cross-sectional map of worksite area 106 representing the measured slope data. Slope visualization logic 356 can provide the visual representation to mapping system 252 for further incorporation with, for example, visual maps of worksite 102.

Fire fighting deployment decision logic 262 illustratively includes fire fighting feasibility analysis logic 340 and escape route identification logic 346. Generally, fire fighting feasibility analysis logic 262 analyzes any of machine-specific information and/or image information captured by image capture component 122 to perform an analysis for determining whether it is feasible to perform a fire fighting operation. For example, information obtained by image capture component 122 can be analyzed by fire fighting feasibility analysis logic 262 to determine terrain characteristics at worksite area 106, determine that a level of insect habitation, such as a measured population of an invasive species (e.g., gypsy moth, among other invasive species specific to tree survival), is present within worksite area 106, and determine other items. Based on this analysis, fire fighting feasibility analysis logic 262 might determine that it is not feasible or recommended to fight a fire at that location. In another example, fire fighting feasibility analysis logic 262 analyzes obtained information to determine that a wind speed is relatively low, and thus determine that it is feasible to fight a fire at that location. Of course, fire fighting feasibility analysis logic 262 can analyze other obtained information such as, but not limited to, a size of worksite area 106, a wind speed and direction, soil moisture levels, cloud coverage, among others, for performing a fire fighting feasibility analysis and generating an action signal, based on the analysis.

Escape route identification logic 346 generates a travel route or other route that is determined to be safe for fire fighters, machine 108, UAV 104, and/or operator 112 to travel along to escape a fire. For example, based on fire fighting feasibility analysis logic 262 determining that a fire fighting operation is to be performed, escape route identification logic 346 analyzes any of machine-specific information and/or image information captured by image capture component 122 to plan an escape path for the machines that are utilized in performing the fire fighting operation. As such, a prescribed travel route of a machine can be updated to represent an escape path for safely removing items within forestry worksite 102 to an area of safety, relative to a current forest fire. The escape route can be continuously or intermittently updated based on changing conditions as they are sensed by UAV 104 and other items. Escape route identification logic 348 can instruct machine interaction logic 258 to provide an output or control signals to machine 108 and/or other items, to control them to avoid the forest fire while performing a fire fighting or other operation. The control can be automatic, semi-automatic, or manual.

Productivity control system logic 266 illustratively includes worksite input logic 358, machine productivity input logic 360, UAV flight path logic 362, categorical productivity image processing logic 364, and categorical productivity output logic 366. Productivity control system logic 266 performs a productivity analysis to determine levels of productivity with respect to specific sub-areas within worksite area 106. As an example only, but not by limitation, productivity control system logic 266 will be described in further detail with respect to a tree harvesting operation. For example, productivity control system logic 266 differentiates between a harvested area, a work in progress area, or an unharvested area within worksite area 106. A harvested area has been harvested of its trees. A work in progress area is partially harvested or has trees that have been cut but are laid on the ground (e.g, trees still required to be removed from the work area). An unharvested area has all trees still standing. Of course, a wide variety of other areas can be identified for determining productivity of an operation being performed at worksite area 106.

More specifically, in one example, image capture component 122 is utilized by productivity control system logic 266 to analyze imagery of worksite area 106, and based on the analyzed imagery, differentiate between the various levels of productivity within worksite area 106. UAV flight path logic 362 can load a map of worksite area 106 and generates a flight path with respect to boundaries of worksite area 106. In one example, UAV flight path logic 362 interacts with UAV interaction logic 256 (e.g., flight path interface logic 318) to generate a flight path that UAV 104 travels to obtain aerial imagery that will be utilized to determine productivity. Worksite input logic 358 utilizes a wide variety of information regarding worksite 106 (such as the imagery information obtained by image capture component 122 along the generated flight path, information obtained by mapping system 252, tree inventory logic 268, among others) to determine worksite characteristics that will be used in analyzing productivity measures. For example, worksite input logic 358 can determine a jobsite size (e.g., acres), tree population such as a number of trees per acre, and tree volume such as a number of pounds per tree. Machine productivity input logic 360 determines a wide variety of information regarding machines 108, such as a measure of uptime of each machine (e.g., amount of time machine is working in the area), number of trees cut, moved, or otherwise harvested by machines 108, etc. This can be obtained by interacting with machine information obtained by machine interaction logic 258, as described above.

Categorical productivity image processing logic 364 uses any of the image information obtained by image capture component 122 along the generated flight path, worksite characteristics determined by worksite input logic 358, machine productivity characteristics determined by machine productivity input logic 358, among other information, to determine the level of productivity for each respective sub-area within worksite area 106. For example, where worksite area 106 has a size of 100 acres, categorical productivity image processing logic 364 identifies a first geographical sub-area of 25 acres that corresponds to a harvested area, a second geographical sub-area of 25 acres that corresponds to a work in progress area, and a third geographical sub-area of 50 acres that corresponds to an unharvested area, respectively, within worksite area 106. To further illustrate this example, categorical productivity image processing logic 364 can identify the second sub-area based on imagery information, obtained by image capture component 122, that identifies trees bundled on the ground, and also based on machine information such as a location of a skidder and a current harvesting operation being performed by that skidder in the second sub-area. Thus, this information is used to determine that this particular geographical area, having boundaries that make it a sub-area of 25 acres, is still being harvested.

Categorical productivity output logic 366 can generate an output, such as an action signal, or control signal indicative of the identified productivity categories and their corresponding geographical areas. For instance, categorical productivity output logic 366 can generate an output indicative of an equipment demand for worksite area 106, such as a number of trucks (e.g., carrying harvested trees) that are moved from the worksite per day. In one example, categorical productivity output logic 366 can load and generate a map that visually represents the first sub-area, second sub-area, and third sub-areas identified within worksite area 106, and/or percentages of the three categories within worksite area 106. Categorical productivity output logic 366 can provide a map representation that visually distinguishes between the sub-areas, such as by shading the areas differently (e.g., hashing, coloring, etc.). Categorical productivity output logic 366 can thus interact with mapping system 252 to generate an output that is provided to user interface component 286 and/or user interface device 204 to provide operator 112 with a visual representation of the productivity analysis (e.g., the shaded map). Categorical productivity output logic 366 can also generate one or more reports, based on the determined completeness of each sub-area, reporting productivity metrics such as a total process time, a total available time to complete a process, a mill demand (e.g., trucks per day, a number of tons of harvested material loaded per truck, etc.), and a comparison of these calculated metrics to a quota for the worksite. In this way, productivity control system logic 266 utilizes aerial imaging of worksite area 106 by UAV system 104, in combination with additional information pertaining to a worksite operation, to accurately determine and report how much of an operation has been completed, as well as estimated jobsite process efficiency (e.g., based on productivity metrics noted above). Categorical productivity output logic 366 can also generate an action signal that can control forestry analysis system 116 to update worksite completion metrics, generating a UAV control signal that controls UAV 104 (e.g., to obtain machine-specific information), a machine control signal to control machine 108, among other action signals.

Machine connectivity logic 270 illustratively includes network connectivity identification logic 384, network connectivity strength analysis logic 386, automated UAV data collection logic 388, partial-assist UAV data collection logic 390, and connectivity trouble code logic 392. It can include other items as well. The variety of analyses discussed above can provide valuable information, and often use data that is otherwise difficult to obtain, especially considering the difficulties presented by forestry worksites. As mentioned above, forestry worksites are often located in remote areas, and some current forestry systems have poor connection capabilities. Thus, while data might be obtained at the machine-level, it can be difficult to upload or otherwise share this data for using the data with, for example, forestry application analyses that generate meaningful information. In accordance with one example, UAV system 104 is utilized to address these challenges by functions as a data collection and forwarding system for machines 108 operating at worksite area 106.

Network connectivity identification logic 384 identifies a network connection, for instance network 286 being a local area network (LAN), wide area network (WAN), or WiFi, among others. In one example, network connectivity identification logic 384 identifies a WiFi network connection between UAV system 104 and machine 108, and identifies a satellite network connection between communication station 110 and remote systems 120, where forestry analysis system 116 is a remote system 120 implemented, for instance, as a cloud computing service. Network connectivity strength analysis logic 386 determines a strength of any of these network connections. Based on the identified network connections and their determined connectivity strength, automated UAV data collection logic 388, partial-assist UAV data collection logic 390 select a particular network for performing data collection and forwarding.

Automated UAV data collection logic 388 illustratively includes machine data collection logic 394, communication station upload logic 396, and data forwarding logic 398. Machine data collection logic 388 can generate instructions that control UAV system 104 to target machines 108 for data collection. Specifically, machine data collection logic 388 can allow UAV system 104 to fly to machines 108, within a certain proximity and according to worksite area 106 boundaries and other worksite information such as tree top height, and hover above each machine 108 to establish a communication connection to collect data. In one example, machine data collection logic 388 can include instructions that allow UAV system 104 to establish a WiFi connection with machine 108 for collecting machine-specific information obtained by machine 108. The instructions identify a particular machine, identify a travel route to the machine, and identify how to collect data from the machine via a communication connection. The instructions can be wholly or partially stored or otherwise provided to UAV 104 prior to a data forwarding operation occurring. Thus, UAV system 104 can be in communication with a remote forestry analysis system 116 to receive instructions of machine connectivity logic 270 during, for example, a data collection calibration operation.

Communication station upload logic 396 generates instructions that control UAV system 104 to target communication station 110 for data upload. Specifically, communication station upload logic 396 can allow UAV system 104 to fly to communication station 110, within a certain proximity (e.g., according to worksite area 106 boundaries and other worksite information such as tree top height, etc.) and hover above communication station 110 to establish a communication connection. The established communication connection is used to upload the collected machine-specific information and a wide variety of other information (such as imagery data obtained by image capture component 122) to communication station 110. Communication station 110 can be located at a worksite headquarters within worksite 102 and therefore serve as a base for UAV system 104.

Upon the collected data being uploaded to communication station 110, data forwarding logic 398 forwards the uploaded data to a remote system. For example, data forwarding logic 398 can forward the collected data to a satellite connection that communicates with forestry analysis system 116 executing at a remote cloud computing service.

Partial-assist UAV data collection logic 390 operates similarly to the features described above with respect to automated UAV data collection logic 388. However, partial-assist UAV data collection logic 390 can incorporate user interactions to perform specific data collection, uploading, storing, and forwarding functions. Partial-assist UAV data collection logic 390 illustratively includes communication device data connectivity logic 301, machine data targeting logic 303, real time productivity interface logic 305, and data storage and forwarding logic 307.

Communication device data connectivity logic 301 controls interaction with communication device 114. This can be used to allow operator 112 to interact with, for example, user interfaces displayed by user interface component 286 in order to select parameters of a data collection operation. Thus, communication device data connectivity logic 301 can allow operator 112 to select particular machines 108, particular data to be obtained by machines 108 (e.g., specific types of sensor data obtained by particular sensors 208) or UAV system 104, a particular flight path for collecting data from machines 108, and particular mechanisms for storing and forwarding the collected data, among other parameters. Operator 112 can therefore utilize a tablet computer or other mobile device (e.g., communication device 114) to interact with user interfaces for customizing a data collection operation, and to interact with data storage and forward functions for providing valuable information to other remote systems 120 (e.g., forestry analysis system 116).

Based at least in part on user input identified with communication device data connectivity logic 301, machine data targeting logic 303 can identify selected machines 108 to be targeted for data collection. Machine data targeting logic 303 can generate instructions that control UAV system 104 to fly to locations of selected machines 108, within a certain proximity (and according to worksite area 106 boundaries and other worksite information such as tree top height), and hover above each machine 108 to establish a communication connection for collecting data. Machine data targeting logic 303 can also control UAV system 104 to obtain specific types of machine information and/or imagery information by image capture component 122, as indicated by a user input provided by operator 112.

In an example where communication device 114 is a tablet computer used by operator 112 within worksite 102, real time productivity interface logic 305 can provide updates and changes to relevant data while an operation is being performed. Real time productivity interface logic 305 can serve as an interface between a data collection operation being executed by partial-assist UAV data collection logic 390 and a productivity analysis being executed by productivity control system logic 266. Thus, as data is collected by machine data targeting logic 303, real time productivity interface logic 305 can generate instructions that update productivity metrics with productivity control system logic 266, and in return control forestry analysis system 116 (e.g., mapping system 252) to update visual maps that are surfaced or displayed by communication device 114. Map changes are therefore made in real time from a management standpoint (e.g., during operation, while data is continuously collected) and updates can be provided to all machines during an operation. Updates during an operation can include updates to points of interest, areas to be harvested, production track history, among other things.

Based at least in part on user input identified with communication device data connectivity logic 301, data storage and forwarding logic 307 can generate instructions that control how data is stored at data store 284 and forwarded to, for example, other remote systems 120 (e.g., forestry analysis system 116). In one example, data storage and forwarding logic 307 can determine that communication device 114 does not have connection to a cellular network for communicating with a remote system 120, and therefore stores the obtained data at communication device 114 until, for example, a communication connection is established, Thus, at least some functionality of forestry analysis system 116 that is executed locally at communication device 114, is utilized to provide real-time, meaningful information to operator 112.

Connectivity trouble code logic 392 illustratively includes trouble code identification logic 309, trouble code notification generator logic 311, and trouble code interface logic 313. Based on connectivity information determined by connectivity strength analysis logic 386, and based on information regarding attempted data storage, upload, and forward techniques of machine connectivity logic 270, among other information, trouble code identification logic 309 can identify a wide variety of trouble codes. For example, where a limited connection is established between mobile machine 108 and UAV system 104, such as a connection having a low bandwidth of data transfer available, trouble code identification logic 309 can identify a trouble code corresponding to limited connection status. Trouble codes identified by trouble code identification logic 309 can also include, for example, codes indicating poor connectivity strength, a distance between communication station 114 and worksite area 106, a travel issue with UAV system 104 (e.g., tree tops are too tall, resulting in a UAV being too far to communicate with mobile machine 108), among others.

Trouble code notification generator logic 311 can generate a notification of the identified trouble code. In one example, trouble code notification generator logic 311 can provide the notification for display at an interface generated with user interface component 286 at communication device 114. Thus, operator 112 can be notified of issues regarding attempted connection establishment, data upload, data forward, and data storage, among other things.

Trouble code interface logic 313 can interface with any of the other items discussed with respect to forestry analysis system 116, and/or computing architecture 200, and can provide instructions for control, based on an identified trouble code. For instance, trouble code interface logic 313 may generate instructions to stop performance of a current operation, or otherwise change or update a machine path or flight path, based on a trouble code indicating a current issue.

Figure 4:
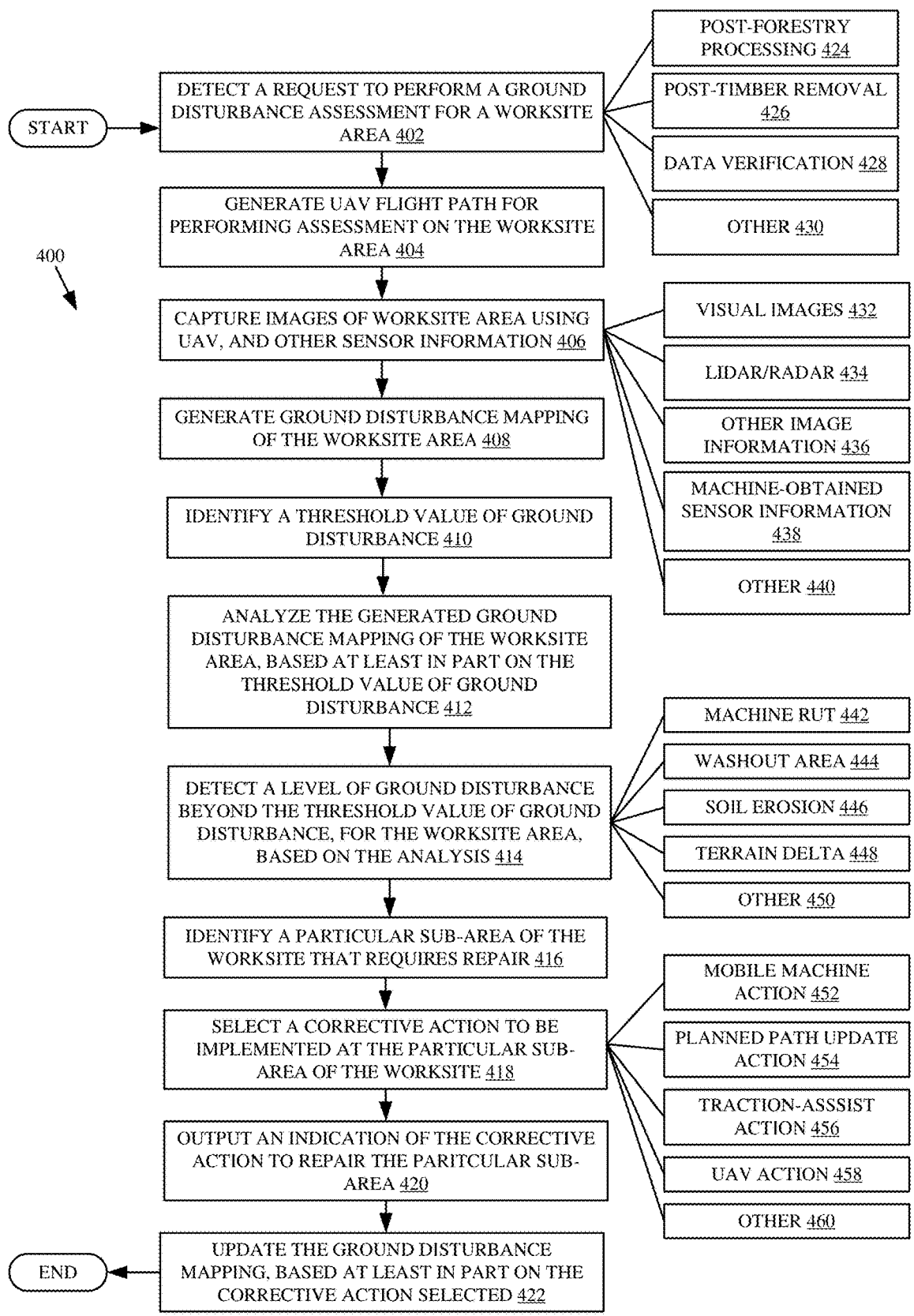
FIG. 4 illustrates a flow diagram showing one example of controlling a UAV to perform a ground disturbance assessment.

FIG. 4 illustrates a flow diagram showing one example 400 of controlling a UAV to perform a ground disturbance assessment 400. At block 402, ground disturbance identification logic 260 detects a request to perform a ground disturbance assessment for a worksite area 106. Ground disturbance assessments can be performed for a wide variety of reasons and at various times during an operation or once an operation is completed. For example, ground disturbance identification logic 260 can determine that a ground disturbance assessment is to be performed for post-forestry processing, as indicated at block 424, post-timber removal, as indicated at block 426, data verification, as indicated at block 428, and a wide variety of others, as indicated at block 430.

Post-forestry processing, as indicated at block 424, includes a ground disturbance assessment that is to be performed after a forestry operation has been fully completed, and thus can be utilized to assess ground surface damage caused by machines utilized in the entirety of a completed forestry operation. Post-timber removal, as indicated at block 426, includes a ground disturbance assessment that is to be performed after a forestry operation has been partially completed (e.g., after some amount of trees have been cut and/or removed but prior to all fallen trees being removed), and therefore can be utilized to assess ground surface damage caused by machines utilized until a current state of an operation. While harvesting is used as an example, it is noted that post-timber removal, as indicated at block 426, can include assessments performed after partial completion of any forestry operation. Data verification, as indicated at block 428, includes a comparison between one set of obtained ground disturbance data (e.g., machine-specific sensor information sensed by sensors 208 on machine 108) to another set of obtained ground disturbance data (e.g., imagery information obtained by image capture component 122 or UAV system 104) to verify ground disturbance for an operation performed at worksite area 106.

At block 404, ground disturbance identification logic 260 generates a flight path for performing the ground disturbance assessment on worksite area 106. For example, ground disturbance identification logic 260 can generate instructions that instruct flight path interface logic 318 to create a flight path for performing the ground disturbance assessment on worksite area 106.

At block 406, ground disturbance identification logic 260 obtains captured images of worksite area 106. For example, ground disturbance identification logic 260 can obtain images captured by image capture component 122 of UAV system 104, and other sensor information. Captured images representing ground disturbance of worksite area 106 illustratively include visual images captured by visual imaging component 242, as indicated at block 432, lidar or radar data representations captured by lidar/radar imaging component 244, as indicated at block 434, and other image information obtained by image capture component 122. Sensor information representing ground disturbance of worksite area 106 can also be obtained by ground disturbance identification logic 260, and can illustratively include machine-specific sensor information sensed by sensors 208 on machine 108, as indicated by block 436, among other information, as indicated at block 440.

At block 408, ground disturbance image processing logic 332 generates a ground disturbance mapping of worksite area 106. For example, ground disturbance image processing logic 332 interfaces with mapping system 252 (e.g., image stitching logic 302) to stitch together images captured by image capture component 122. This is used to generate a mapped representation of worksite area 106 having a measured ground disturbance.

At block 410, ground disturbance threshold logic 330 identifies a threshold value of ground disturbance, such as a measure of soil erosion or washout, a measure of rut depth, a measure of an amount of material (e.g., cut trees, leaves, other material) overlaying a ground surface, among a wide variety of other threshold values.

At block 412, ground disturbance image processing logic 332 analyzes the generated ground disturbance mapping (or mapped representation) of worksite area 106, based at least in part on the threshold value of ground disturbance generated by ground disturbance threshold logic 330. That is, ground disturbance image processing logic 332 can compare a measured value of ground disturbance, for each area within worksite area 106 having some detected ground disturbance and represented on the mapped representation, to a threshold value of ground disturbance. AT block 412, ground disturbance image processing logic 332 can generate a set of ground disturbance metrics, each having a value indicative of a ground disturbance at a different geographic location, based on the imagery information. The value of the ground disturbance metric might include a difference in a smoothness of the ground at the geographical location, relative to a smoothness of the ground at other, proximate locations.

At block 414, ground disturbance image processing logic 332 detects that a level of ground disturbance is beyond the threshold value of ground disturbance for an area, based at least in part on the analysis performed at block 412. For example, the analysis indicated at block 412 can be used to determine that a measured ground disturbance, such as a measured rut depth (where the rut was caused by operation of machine 108 within worksite area 106) at a given location on the mapped representation of worksite area 106 exceeds a threshold value of rut depth (e.g., measured rut depth value of 3 inches exceeds a threshold rut depth value of 1 inch). Ground disturbance image processing logic 332 can detect that a level of ground disturbance is beyond a threshold value of ground disturbance for a wide variety of different types of ground disturbances, such as a machine rut disturbance, as indicated at block 442, a washout area, as indicated at block 444, a level of soil erosion, as indicated at block 446, a difference in terrain characteristics such as a terrain delta, as indicated at block 448, among other types of ground disturbances shown at block 450. For instance, from the imagery information, a given location that has a ground disturbance indicator indicative of likely ground disturbance can be identified.

At block 416, area of correction identification component 336 identifies a particular sub-area of the worksite area 106 that requires repair and generates an action signal. For instance, ground disturbance image processing logic 332 can identify points on the mapped representation of worksite area 106 where measured ground disturbance exceeds the threshold level of ground disturbance, and can also identify how the identified points correspond to respective geographical positions of worksite area 106. Area of correction identification component 336 can thus identify sub-areas or geographical regions in worksite area 106 that correspond to the identified points indicating excessive ground disturbance. Area of correction identification component 336 thus identifies one or more geographical areas of worksite area 106 that experience an unacceptable level of ground disturbance and thus that require repair. As an example, where a measured rut depth exceeds a threshold value of rut depth at a position on the ground disturbance map, area of correction identification component 336 can identify a geographical area of 100 square feet that corresponds to the disturbance by the rut (and some boundary area around the rut) and that is to be repaired.

At block 418, corrective action selection component 338 selects a particular corrective action to be implemented at the particular sub-area of worksite area 106. For instance, based at least in part on the measured ground disturbance, and the identified sub-area to be repaired, corrective action selection component 338 can automatically select the most appropriate corrective action to be implemented at the particular sub-area. Corrective action selection component 338 can select the most appropriate corrective action to be implemented based on a variety of different criteria, such as the type of disturbance, the types of machines 108 in the area, the cost of different operations, the time to perform different operations, the safety of different operations, etc. In one example, corrective action selection component 338 can select the most appropriate corrective action to be implemented based on an indication of a user input that selects a particular action. The particular action selected by corrective action selection component 338 can include any of a mobile machine action, as indicated at block 452, a planned path update action, as indicated at block 454, a traction-assist action, as indicated at block 456, a UAV action, as indicated at block 458, among other actions as shown at block 460.

A mobile machine action, as indicated at block 452, can include instructions to control mobile machine 108 to perform a ground disturbance correction (e.g., instructions to perform an operation that fills a machine-induced rut). A planned path update action, as indicated at block 454, can include instructions to modify a prescribed travel route of machine 108 to reduce additional ground disturbance. A traction-assist action, as indicated at block 456, can include instructions to implement traction-assist features with mobile machine 108 to reduce further ground disturbance. A UAV action, as indicated at block 458, can include instructions to obtain additional imagery by image capture component 122, or for instance, instructions to control UAV 104 to obtain the additional images.

At block 420, ground disturbance correction logic 334 generates and outputs an indication of the corrective action selected to repair the particular sub-area. For example, ground disturbance correction logic 334 can output a notification for notifying operator 112 (e.g., by user interface component 246 and/or user interface device 204) of the selected action, a control signal to control any of the machines or vehicles 108 at worksite 102, and a wide variety of other outputs.

At block 422, ground disturbance identification logic 260 updates the ground disturbance mapping, based at least in part on the corrective action that was selected. For example, ground disturbance identification logic 260 can perform additional ground disturbance assessments once a corrective action has been selected and/or performed, to determine if any further corrective action is required to reduce ground disturbance at worksite area 106. In one example, an action signal is output.

Figure 5:
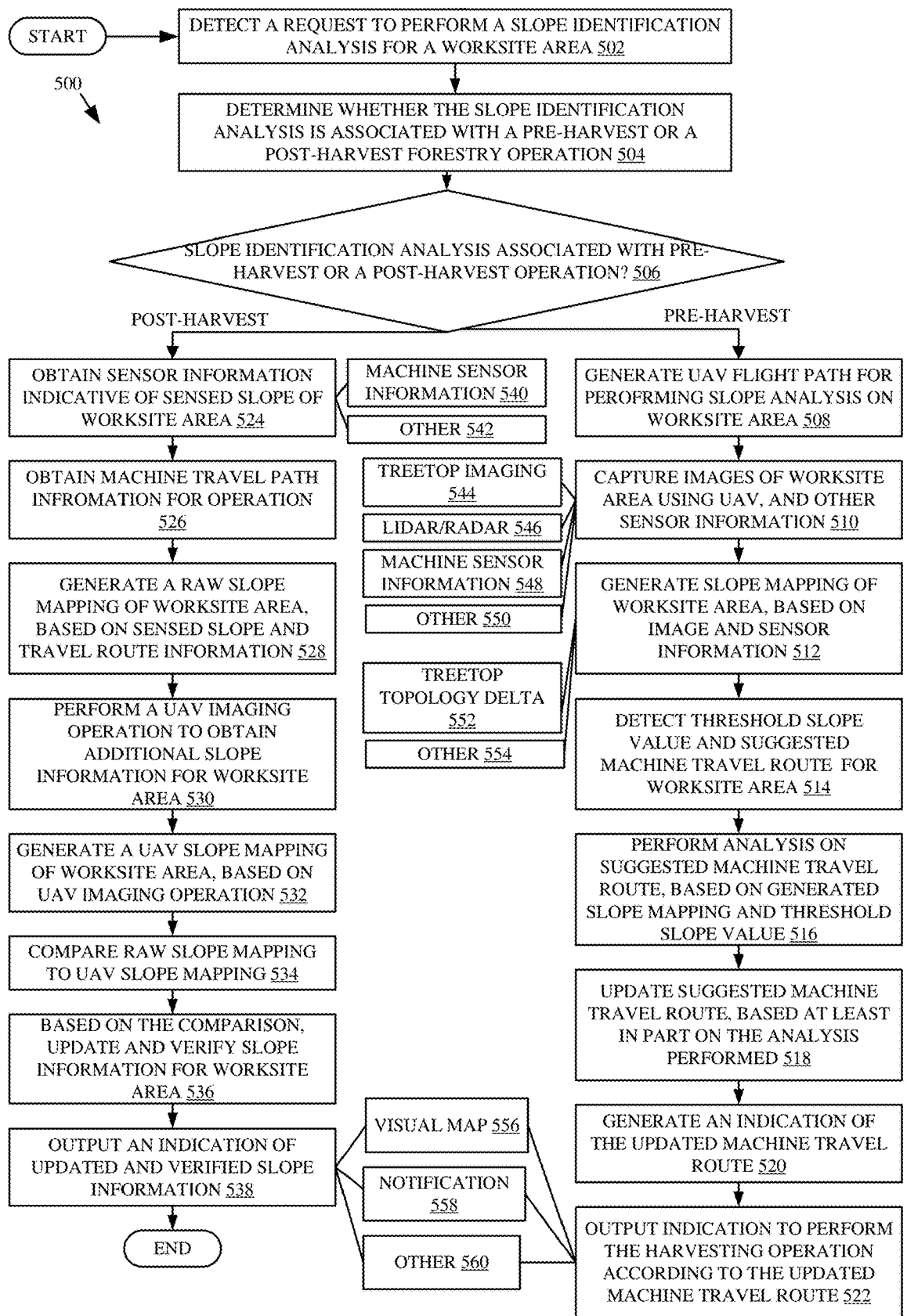
FIG. 5 illustrates a flow diagram showing one example of controlling a UAV to perform a slope identification analysis.

FIG. 5 illustrates a flow diagram showing one example 500 of controlling a UAV to perform a slope identification analysis. At block 502, slope identification logic 264 detects a request to perform a slope identification analysis for worksite area 106. Again, this can be an automated request or a request from any operators or individuals.

At block 504, slope identification logic 264 determines whether the slope identification analysis, to be performed, is associated with a pre-harvest or a post-harvest forestry operation. Slope identification logic 264 can differentiate between a slope analysis for a pre-harvest or a post-harvest forestry operation based on, for example, information received from machine operation identification logic 258. For example, machine operation identification logic 258 can be used to determine whether one or more machines 108 are currently performing a harvesting operation. Slope identification logic 264 can also use forestry analysis-type input logic 308 to determine whether the requested analysis is selected (e.g., automatically or manually by user input) to be pre-harvest or post-harvest analysis. A pre-harvest slope analysis can use aerial imagery to measure slope of worksite area 106. A post-harvest slope analysis can use aerial imagery in combination with other sensor-specific information from machines 108 to verify a measured slope of worksite area 106.

At decision block 506, slope identification logic 264 can select that the slope analysis is associated with either of a pre-harvest operation or a post-harvest operation. At block 508, where slope identification logic 264 selects a pre-harvest operation, slope identification logic 264 generates a UAV flight path to obtain imagery information indicative of a slope of worksite area 106 by using image capture component 122. For example, slope identification logic 264 can generate instructions that interface with flight path interface logic 318 for controlling UAV system 104 according to a generated flight path.

At block 510, slope image processing logic 350 instructs UAV system 104 to capture images of worksite area 106 using image capture component 122 and/or obtain other information (such as information using attribute sensors 230). As indicated at block 544, slope image processing logic 350 can instruct UAV system 104 to capture treetop or other worksite area 106 imagery information using visual imaging component 242. As indicated at block 546, slope image processing logic 350 can instruct UAV system 104 to capture lidar/radar information indicating slope of worksite area 106 by using lidar/radar imaging component 244. Of course, slope image processing logic 350 can instruct UAV system 104 to obtain other information as well, as indicated at block 550.

At block 512, slope image processing logic 350 generates a slope mapping of worksite area 106, based on the captured images and other information obtained at block 510. For example, slope image processing logic 350 can interface with mapping system 252 (e.g., image stitching logic 302) to stitch together images captured by image capture component 122 into a mapped representation of worksite area 106 having measured slope values. A mapping of slope for worksite area 106 can indicate various sub-areas and their corresponding measured slope values, such that sub-areas can be identified for avoidance by machine 108, or as areas machine 108 should work in, as it performs an operation. As indicated at block 552, the generated slope mapping can represent a treetop topology delta (such as a difference in measured height of trees according to analysis performed on treetops within worksite area 106). For example, slope image processing logic 350 can determine differences in a height of trees, and uses the differences to measure slope changes for worksite area 106. The generated slope mapping can indicate other slope measures as well, as indicated at block 554.

At block 514, slope threshold logic 348 identifies a threshold value of ground slope, and machine path and slope consideration logic 354 identifies a suggested machine travel route for worksite area 106. For example, machine path and slope consideration logic 354 identifies a prescribed travel route of machine 108 for performing an operation within worksite area 106, based on slope.

At block 516, machine path and slope consideration logic 354 performs a slope analysis with respect to the suggested machine travel route, based on the generated slope mapping and the identified threshold value of ground slope. At block 516, slope image processing logic 350 can generate a set of slope metrics, each having a value indicative of a measure of slope at a different location in the forestry worksite, based on the imagery information. In one example, machine path and slope consideration logic 354 can identify the particular sub-areas within worksite area 106 having a measured slope value that exceeds the threshold value of ground slope. If any of the particular sub-areas are also geographical regions in which machine 108 is prescribed to travel over, according to the prescribed machine travel route, then machine path and slope consideration logic 354 can identify these sub-areas as problem areas that require machine path correction. At block 518, machine path and slope consideration logic 354 updates the suggested machine travel route, based at least in part on the analysis performed at block 516. Updating the suggested machine travel route at block 518 can include modifying the suggested travel route to avoid the problem areas (e.g., areas where the slope is too large) or, for example, generate a new prescribed machine path.

At block, 520, machine path and slope consideration logic 354 generates an indication of the updated machine path. At block 522, slope identification logic 264 outputs the indication. The indication can be used to control machine 108 to perform the harvesting operation along the updated travel route. In one example, slope visualization logic 356 provides an output of the updated machine travel route with a visual map, as indicated at block 556. As indicated at block 558, slope identification logic 264 can generate a notification for notifying operator 112 (e.g., by user interface component 246 and/or user interface device 204) of the updated machine travel route. Other outputs can be provided as well, as indicated at block 560.

Thus, it can be seen that slope identification logic 264 can, prior to an operation being performed, utilize UAV system 104 to measure slope of worksite 106, and thus identify areas having a slope greater than a threshold slope to update a machine travel route for avoiding large slopes. This can be used to improve machine efficiency, because machines 108 experience less slippage and produce less damage to worksite area 106, thereby also improving productivity of a harvesting operation.

Turning to block 524, where slope identification logic 264 selects a post-harvest operation rather than a pre-harvest operation at decision block 506, slope identification logic 264 obtains sensor information indicative of sensed slope of worksite area 106. At block 540, slope identification logic 264 obtains machine-specific sensor information, such as information sensed by sensors 208 or by one or more machines 108. For example, while machines 108 are performing a harvesting operation, sensors 208 can sense slope of worksite area 106. This sensed slope can be verified by slope identification logic 264 to improve accuracy of further slope measurements.

At block 526, slope identification logic 264 obtains machine travel path information for the harvesting operation (e.g., machine travel path traveled for a completed harvesting operation or machine travel path currently in progress for a current harvesting operation). Machine travel path information can generally include a geographical location at which machine 108 is positioned during the harvesting operation. At block 528, slope identification logic 264 generates a raw mapping of worksite area 106, based on the sensed slope and geographical location information. For instance, slope identification logic 264 can interface with mapping system 252 to generate a raw mapping of measured slope values across worksite area 106, and in particular across sub-areas in which machine 108 travels. The raw mapping can be used to verify the accuracy of raw slope sensing techniques, such as to calibrate sensors 208 or verify accuracy of slope identification logic 264.

At block 530, slope identification logic 264 controls UAV 104 to perform an imaging operation to obtain additional slope information for worksite area 106. For example, block 530 includes any of the features discussed above with respect to blocks 508 and 510.

At block 532, slope identification logic 264 generates a UAV slope mapping of worksite area 106, based on the UAV imaging information captured by image capture component 122 and other sensor information (e.g., and in accordance with the features discussed with respect to block 512).

At block 534, slope verification logic 352 compares the raw slope mapping generated at block 528 to the UAV slope mapping generated at block 532. Slope verification logic 352 can identify differences between raw slope data of the raw slope mapping and the imaged slope data of the UAV slope mapping. Slope verification logic 352 can also generate a metric indicative of a degree of difference between the two types of measured slope information.

At block 536, slope verification logic 352 updates and verifies the slope information for worksite area 106, based on the comparison. In one example, where a raw slope value conflicts with an imaged slope value, slope verification logic 352 can use one or more rules to select a prevailing measured slope value. If slope verification logic 352 determines that the conflicting values are relatively close to one another (e.g., small degree of difference), slope verification logic 352 might select a particular one of the values as being a prevailing value based on one or more rules. If, however, slope verification logic 352 determines that the conflicting values are not relatively close to one another (e.g., large degree of difference), slope verification logic 352 can take an average of the two values or generate a new, accurate slope value in other ways.

At block 538, slope identification logic 264 outputs the indication of the updated and/or verified slope information. For instance, slope visualization logic 356 can provide an output of the updated slope information with a visual map, as indicated at block 556. Outputs provided with a visual map can suggest "no go" areas such as wetlands, sink holes, very steep terrain, etc. As indicated at block 558, slope identification logic 264 generates a notification for notifying operator 112 (e.g., by user interface component 246 and/or user interface device 204) of the updated and/or verified slope information. Outputs provided as a notification can include operator assistance features that suggest a most efficient route of travel based on the updated and/or verified slope information. Other outputs of the updated and/or verified slope information can be provided as well, as indicated at block 560. In one example, an action signal is output.

Thus, operation 500 illustratively improves travel of machine 108, and therefore improves productivity of worksite 102, by identifying problem-areas of worksite 106 (e.g., having steep slope above a threshold) and updating travel routes of machine 108, based on verified slope information.

Figure 6:
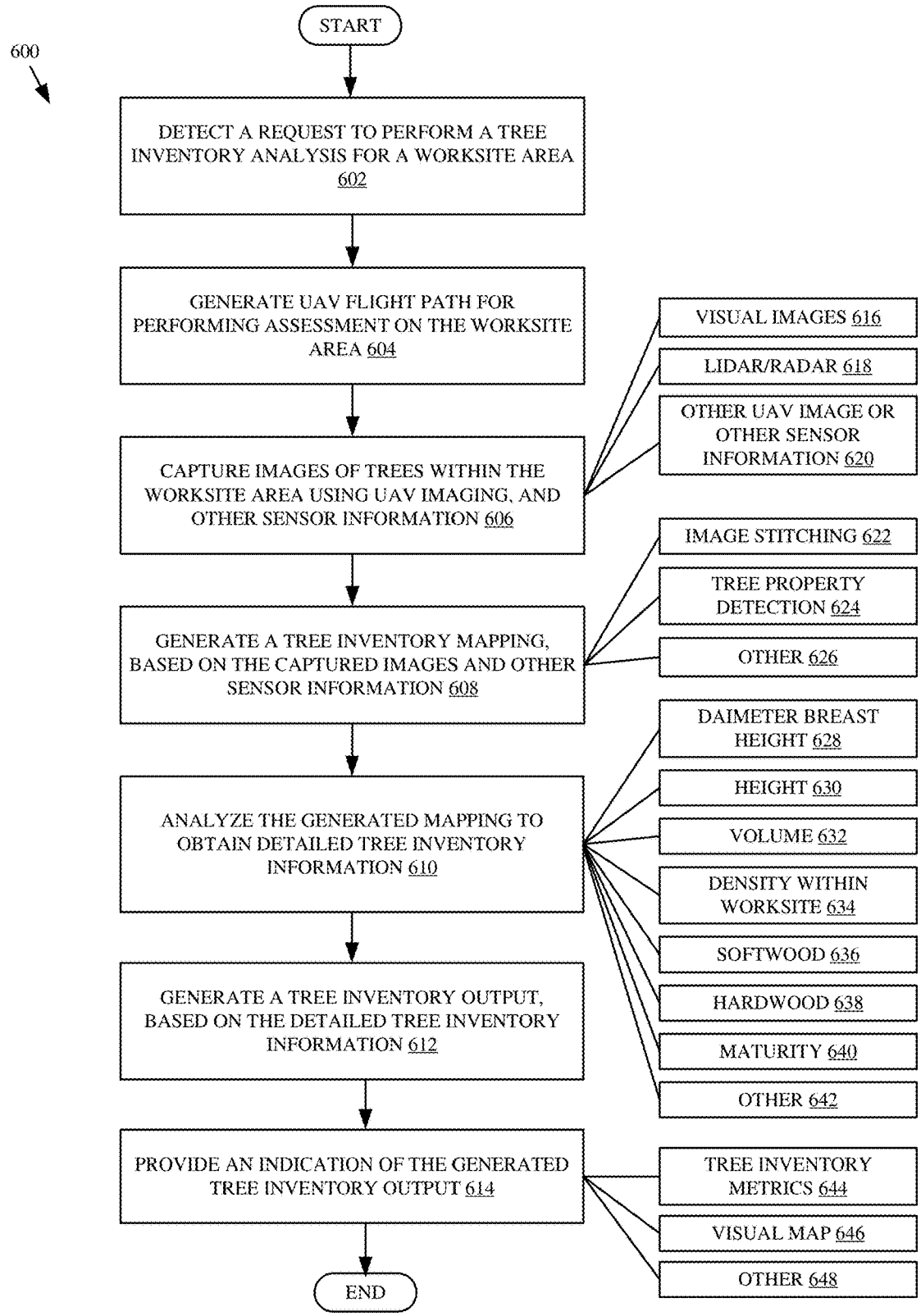
FIG. 6 illustrates a flow diagram showing one example of controlling a UAV to perform a tree inventory analysis for a worksite area.

FIG. 6 illustrates a flow diagram showing one example 600 of controlling a UAV to performing a tree inventory analysis for a worksite area. At block 602, tree inventory logic 268 detects a request to perform a tree inventory analysis for worksite area 106. This request can be automated or manual or a combination of both.

At block 604, tree inventory logic 268 generates a UAV flight path for performing the tree inventory analysis on worksite area 106. For example, tree inventory logic 268 can generate instructions that interface with flight path interface logic 318 for controlling UAV 104 according to a generated flight path. The flight path generated by tree inventory logic 268 can be particular to obtaining imagery information, indicating tree properties of worksite 106, with image capture component 122.

At block 606, tree inventory logic 268 instructs UAV 104 to capture images of worksite area 106 using image capture component 122 and/or obtain other information using attribute sensors 230. As indicated at block 616, tree inventory logic 268 can instruct UAV 104 to capture visual images of trees using visual imaging component 242. As indicated at block 618, tree inventory logic 268 can instruct UAV 104 to capture lidar/radar information indicating tree properties by using lidar/radar imaging component 244. Tree inventory logic 268 can instruct UAV 104 to obtain other information as well, as indicated at block 620.

At block 608, tree metric image processing logic 368 generates a tree inventory mapping, based on the captured images and other sensor information. For example, as indicated at block 622, tree metric image processing logic 368 can interface with mapping system 252 (e.g., image stitching logic 302) to stitch together images captured by image capture component 122 into a mapped representation of worksite area 106 having tree information. In one example, as indicated at block 624, tree metric image processing logic 368 can use tree property detection techniques to generate the mapped representation of worksite area 106 for representing tree information. For example, specific measures of tree properties can be determined from the mapping. Of course, tree metric image processing logic 368 can generate the tree inventory map in other ways as well, as indicated at block 626.

At block 610, tree metric image processing logic 368 analyzes the generated mapping, including the measured tree properties, to obtain detailed tree inventory information. Detailed tree inventory information can include metrics pertaining to each type of measured tree property. At block 628, diameter breast height logic 370 generates metrics indicative of a measured diameter breast height. At block 630, height logic 372 generates metrics indicative of a measured tree height. At block 632, volume logic 374 generates metrics indicative of a measured volume of a tree population. At block 634, density per area logic 376 generates metrics indicative of a density of trees per worksite area 106. At block 636, softwood logic 378 generates metrics indicative of softwood (e.g., identifies tree type as conifer). At block 638, hardwood logic 380 generates metrics indicative of hardwood (e.g., identifies tree type as deciduous). As a further example, tree metric image processing logic 368 can be configured to generate metrics pertaining to tree maturity, such as age and health, or other items.

At block 612, processed tree metric output component 382 generates a tree inventory output based on the detailed tree inventory information. Outputs can include values indicating the metrics themselves, comparisons of metrics, and a wide variety of other outputs. Processed tree metric output component 382 can generate output signals indicating any of the determined tree metrics, as well as an action signal. An action signal generated by processed tree metric output component 382 can, for example, include machine deployment signals to control deployment of a forestry machine at worksite area 106, or at specific geographic locations based on the tree inventory metrics.

At block 614, processed tree metric output component 382 provides an indication of the tree inventory output. Processed tree metric output component 382 can provide an indication of the output to indicate the tree inventory metrics 644. For example, tree inventory metrics can be provided to operator 112 as notifications indicating the numerical values of tree inventory metrics. Processed tree metric output component 382 can provide an indication of the tree inventory output as a visual map, as indicated at block 646. Thus, worksite area 106 can be visualized, according to functionality of mapping system 252 discussed above, with visual representations of the tree metrics. Of course, the tree inventory output can be provided in other ways as well, as indicated at block 648. In one example, an action signal is provided as an output.

Figure 7:
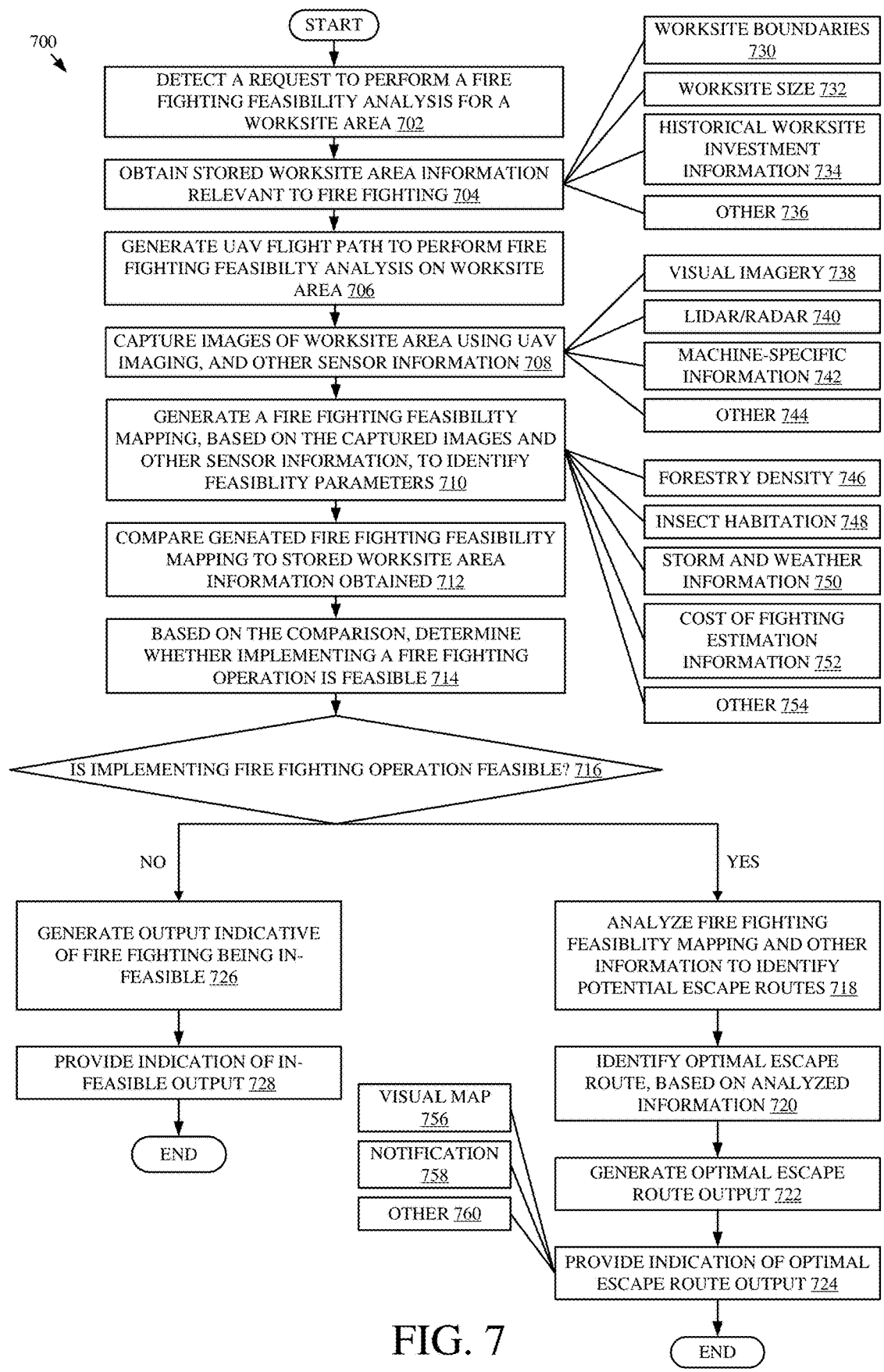
FIG. 7 illustrates a flow diagram showing one example of controlling a UAV to perform a fire-fighting feasibility analysis for a worksite area.

FIG. 7 illustrates a flow diagram showing one example 700 of controlling a UAV to perform a fire-fighting feasibility analysis for a worksite area. At block 702, fire fighting deployment decision logic 262 detects a request to perform a fire fighting feasibility analysis for worksite area 106. As with other requests, this can be automated, manual, or a combination of both.

At block 704, fire fighting deployment decision logic 262 obtains information regarding worksite area 106 that is relevant to fire fighting operations. For instance, fire fighting deployment decision logic 262 can obtain stored information regarding worksite area 106, such as worksite boundaries 730, worksite size 732, and historical worksite investment information 734. In one example, fire fighting deployment decision logic 262 can interface with historic area of interest identification logic 310 to identify worksite boundaries 730, worksite size 732, and investment information (e.g., hours invested, money invested, start date of forestry operations, end date of operations, etc.) 734, among other information 736.

At block 706, fire fighting deployment decision logic 262 generates a UAV flight path for performing the fire fighting feasibility analysis on worksite area 106. For example, fire fighting deployment decision logic 262 can generate instructions that interface with flight path interface logic 318 for controlling UAV 104 according to a generated flight path. The flight path generated by fire fighting deployment decision logic 262 can control UAV 104 to obtain imagery information indicative of fire fighting parameters for worksite 106 by using image capture component 122.

At block 708, fire fighting deployment decision logic 262 instructs UAV 104 to capture images of worksite area 106 using image capture component 122 and/or obtain other information using attribute sensors 230. As indicated at block 738, fire fighting deployment decision logic 262 instructs UAV 104 to capture visual imagery using visual imaging component 242. As indicated at block 740, fire fighting deployment decision logic 262 can instruct UAV 104 to capture LIDAR/radar information indicating fire fighting parameters of worksite area 106 by using lidar/radar imaging component 244. Fire fighting deployment decision logic 262 can instruct UAV 104 to obtain machine specific information, as indicated at block 742, and other information, as indicated at block 744.

At block 710, fire fighting deployment decision logic 262 generates a fire fighting feasibility mapping of worksite area 106, based on the captured images and other information obtained at block 708. For example, fire fighting deployment decision logic 262 can interface with mapping system 252 (e.g., image stitching logic 302) to stitch together images captured by image capture component 122 into a mapped representation of worksite area 106, such that the mapping also represents a feasibility of fighting a fire in worksite area 106. Fire fighting feasibility logic 262 can generate the mapping to indicate that particular sub-areas, of worksite area 106 as being either feasible or not feasible for performing a fire fighting operation. The fire fighting feasibility mapping can represent a wide variety of measured parameters for determining whether it is feasible to fight a fire, such as forestry density 746, insect habitation 748 (e.g., pest infestation), storm and weather impact information 750, and cost of fighting estimation information 752, among other information 754.

At block 712, fire fighting feasibility analysis logic 340 compares the fire fighting feasibility mapping generated at block 710 to the stored worksite area information obtained at block 704. For example, fire fighting feasibility analysis logic 340 compares a size of worksite area 732 to a density of forestry material 744. This comparison can be used to determine terrain characteristics at worksite area 106, generate a metric that indicates worksite area 106 is too large, too steep, and/or too dense for stopping a forest fire. As another example, fire fighting feasibility analysis logic 340 compares insect habitation 746 (e.g., invasive species habitation) to an amount of investment (e.g., number of hours spent harvesting in worksite area 106). This comparison can be used to generate a metric that indicates worksite area 106 has not invested enough and has too many invasive species of insects to be valuable enough for implementing a fire fighting operation. Of course, these are just examples and fire fighting feasibility analysis logic 340 can compare a wide variety of different types of information to perform a fire fighting feasibility analysis.

At block 714, fire fighting feasibility analysis logic 340 determines whether implementing a fire fighting operation is feasible, based the comparison discussed above with respect to block 712. As similarly mentioned above, fire fighting feasibility analysis logic 340 can determine that a fire fighting operation is not feasible when worksite area 106 is determined to have characteristics that, for example, increase a risk of implementing a fire fighting operation, reduce a value of worksite 106 beyond a level that would warrant implementing a fire fighting operation, or that require excessive costs to implement a fire fighting operation, among others. Fire fighting feasibility analysis logic 340 can determine that a fire fighting operation is feasible when worksite area 106 is determined to have characteristics that, for example, reduce risk of implementing a fire fighting operation, increase the value of worksite 106, or otherwise do not require excessive costs to implement a fire fighting operation. Of course, other characteristics can be considered by fire fighting feasibility analysis logic 340.

At decision block 716, fire fighting feasibility analysis logic 340 can determine whether it is feasible to implement a fire fighting operation. At block 718, where fire fighting feasibility analysis logic 340 determines that it is feasible to implement a fire fighting operation, an action signal is generated, for example where escape route identification logic 346 can analyze the fire fighting feasibility mapping and other information (such as machine-specific sensor information) to identify potential escape routes. Potential escape routes can include travel routes for firefighters, operator 112, machine 108, and for other items in worksite 102.

At block 720, escape route identification logic 346 selects a particular one of the potential escape routes, based on the analyzed fire fighting feasibility mapping and other information. Escape route identification logic 346 can select the most safe or most efficient escape route as an optimal escape route. At block 722, escape route identification logic 346 generates an output indicating the optimal escape route selected.

At block 724, escape route identification logic 346 provides an indication of the optimal escape route output generated at block 722. Escape route identification logic 346 can provide the output as a visual map 756, a notification 758, or another output 760. For example, escape route identification logic 346 can identify a travel route through worksite area 106 that operator 112 and or machines 108 travel to be safely removed from danger presented by a forest fire. In such an example, escape route identification logic 346 can provide an output indicating a travel route according to the optimal escape route to mapping system 252 for incorporation with a visual map of worksite area 106. Escape route identification logic 346 can provide an output indicating a notification that is presented to operator 112 (e.g., by user interface component 246 and/or user interface device 204). the escape route can be continuously updated based on new aerial imagery, weather changes, and other things.

At block 726, where fire fighting feasibility analysis logic 340 determines that it is not feasible to implement a fire fighting operation, an action signal is generated, for example where fire fighting deployment decision logic 340 generates an output indicating the fire fighting operation is not feasible. At block 728, fire fighting feasibility analysis logic 340 provides an indication of the infeasible output (e.g., action signal). The indication of the fire-fighting operation being infeasible can be provided as a notification to operator 112 or in a variety of other ways as well. For example, operator 112 can receive a notification at communication device 114 indicating that fire fighting feasibility analysis logic 340 has determined that a particular fire fighting operation is not feasible for a location at worksite area 106. This is just one example.

Figure 8:
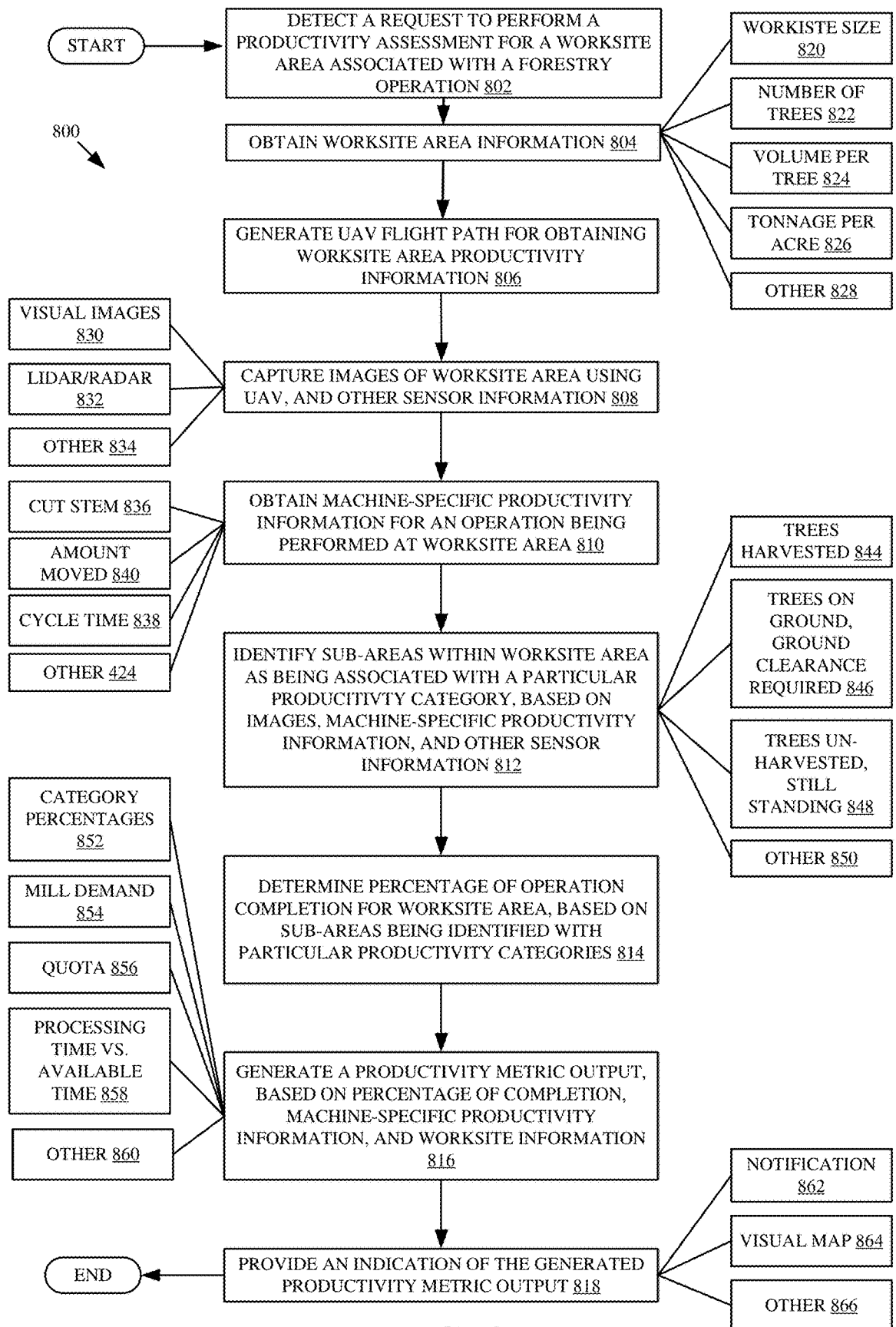
FIG. 8 illustrates a flow diagram showing one example of controlling a UAV to perform a productivity and control assessment for a worksite area associated with a forestry operation.

FIG. 8 illustrates a flow diagram showing one example 800 of controlling a UAV to perform a productivity and control assessment for a worksite area associated with a forestry operation. At block 802, productivity control system logic 266 detects a request to perform a productivity assessment for worksite area 106. This request can be automatic, manual, or a combination of both.

At block 804, worksite input logic 358 obtains information regarding worksite area 106 that is relevant to performing a productivity assessment. For instance, worksite input logic 358 can interface with area of interest identification logic 254 and mapping system 252 to obtain information regarding characteristics of worksite area 106. Based on the obtained information, worksite input logic 358 can identify particular characteristics that will be used in performing a worksite productivity and control assessment for worksite area 106. Worksite input logic 358 thus can identify any of worksite size 820, a number of trees 822, a volume per tree 824, a tonnage per acre 826, and a wide variety of other worksite characteristic information 828.

At block 806, UAV flight path logic 362 generates a UAV flight path for obtaining worksite productivity information. Based on the worksite characteristics obtained at block 804, UAV flight path logic 362 generates instructions that control UAV 104 (e.g., by interfacing with flight path interface logic 318) to travel along a defined flight path, where the flight path is defined to allow UAV 104 to obtain imagery information that is specific to a productivity and control assessment for worksite area 106.

At block 808, productivity control system logic 266 instructs UAV 104 to capture images of worksite area 106 using image capture component 122, and/or to obtain other information using attribute sensors 230. Productivity control system logic 266 can instruct UAV system 104 to capture visual imagery 830 using visual imaging component 242, LIDAR/radar information 832 using lidar/radar imaging component 244, and other information, as indicated at block 834. Images of worksite area 106 can be analyzed to determine where an operation has been completed, and where an operation is currently in progress. Thus, by using aerial imagery information captured by UAV 104, an entire worksite area 106 can be examined for obtaining detailed productivity information.

At block 810, machine productivity input logic 360 obtains machine-specific productivity information for an operation performed at worksite area 106. For instance, machine productivity input logic 360 obtains information sensed or otherwise collected by machine 108 and is indicative of how machine 108 is performing a current operation (e.g., indicative of performance of a harvesting operation). Information obtained by machine productivity input logic 360 can indicate productivity metrics specific to a machine, such as cut stem information 840 (e.g., number of stems cut, frequency of cutter being used, etc.), a cycle time 842 (e.g., amount of time machine 108 has been in use for performing a harvesting operation, etc.), an amount of material moved 840 (e.g., number of trees moved from ground pile to vehicle for transport, etc.), among other productivity information 842.

At block 812, categorical productivity image processing logic 364 identifies sub-areas within worksite area 106 as being associated with a particular productivity category, based on the imagery and machine-specific information. That is, categorical productivity image processing logic 364 can use aerial imagery captured by UAV system 104 and productivity information of machine 108 to determine which geographical regions of worksite area 106 are completed, are currently being worked in, or have not yet been worked in. For example, categorical productivity image processing logic 364 identifies sub-areas of worksite area 106 where trees are harvested 844, identifies sub-areas where trees are on the ground but require clearance 846, identifies sub-areas where trees are unharvested and thus still standing 848, and identifies other sub-areas of operation progress 850.

At block 814, categorical productivity image processing logic 364 determines a percentage of completion of an operation being performed at worksite area 106, based on the identified sub-areas (e.g., by aggregating the productivity categories). For example, where there is a large number of sub-areas identified as having trees harvested 844, and there is a small number of sub-areas identified as having trees on the ground 846 (e.g., cut, yet need to be removed from worksite area 106), then categorical productivity image processing logic 364 might determine a percentage of completion that indicates that a majority (or a specific percentage) of a harvesting operation for worksite area 106 is already complete. As another example, where there is a small number of sub-areas identified as having trees harvested 844, and there is a large number of sub-areas identified as having trees still standing 848, then categorical productivity image processing logic 364 might determine a percentage of completion that indicates that a harvesting operation for worksite area 106 has just been started, and that a majority (or a specific percentage) of the operation is yet to be performed.

At block 816, categorical productivity output logic 366 generates a productivity output, based on the percentage of operation completed, the machine-specific information, and the worksite information. The percentage completion can be utilized, along with other information, by categorical productivity output logic 366 to generate a measured value of productivity obtained in performing the operation at worksite area 106. In one example, categorical productivity output logic 366 can generate a productivity measure as a percentage of each category 852 identified in the entire worksite area 106. That is, productivity of worksite area 106 can be identified as 25 percent harvest complete, 20 percent harvest in progress, and 55 percent not yet harvested, as one example. Also, in one example, categorical productivity output logic 366 can generate a productivity output indicating a mill demand 854, such as a number of trucks per day (e.g., the number of trucks, hauling loads of cut trees, will be identified for worksite area 106 for the harvesting operation). Categorical productivity output logic 366 can also generate an estimated productivity metric such as a quota, an estimated tonnage of material (e.g., harvested trees) that will be produced from the harvesting operation, and other estimated metrics, according to the determined metrics of productivity. Further, in one example, categorical productivity output logic 366 can generate a productivity metric as a comparison of total operation time to total available time for the operation, or such as a determined operation efficiency for worksite area 106. Categorical productivity output logic 366 can generate other productivity metrics 860. In accordance with block 816, categorical productivity output logic 366 can also generate such as an action signal to control forestry analysis system 116 to update worksite completion metrics, control UAV 104 (e.g., to obtain machine-specific information), control machine 108, among other action signals.

At block 818, categorical productivity output logic 366 provides an indication of the productivity metric output generated. Categorical productivity output logic 366 can provide the output as a notification, as indicated at block 862. For example, categorical productivity output logic 366 generates a notification for notifying operator 112 (e.g., by user interface component 246 and/or user interface device 204) of the productivity metric, such as the percentages of each category of completion for the operation being performed at worksite area 106. Categorical productivity output logic 366 can also provide the output with a visual map, as indicated at block 864. Outputs provided with a visual map, for example, can represent the varying sub-areas of completion level, among other information such as a processing time versus available time for each machine 108 currently operating within worksite area 106. Of course, outputs (e.g., action signals) of the productivity assessment can be provided in other ways as well, as indicated at block 866.

Figure 9:
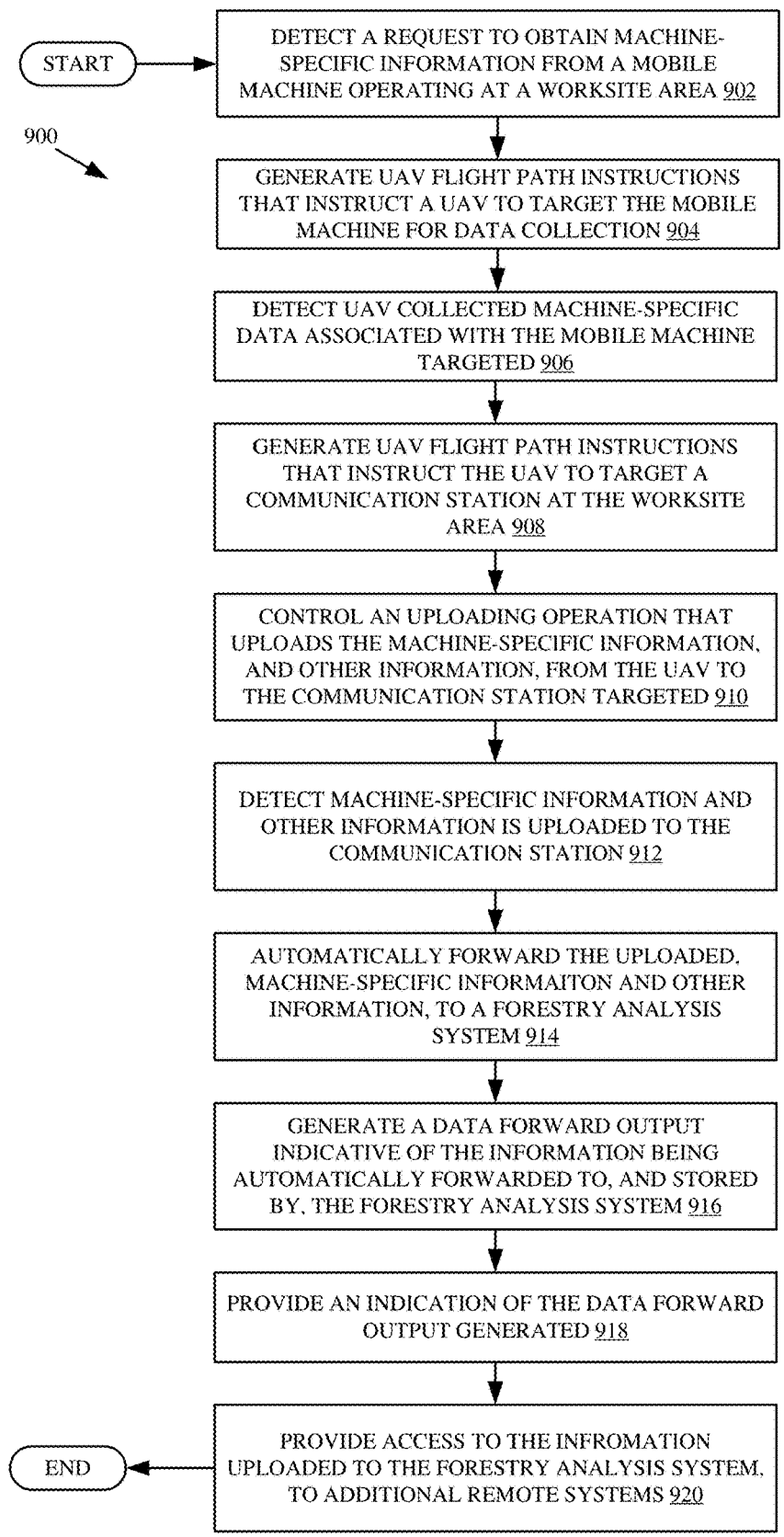
FIG. 9 illustrates a flow diagram showing one example of controlling a UAV to perform automatically obtain machine-specific information of a mobile machine operating in a worksite area.

FIG. 9 illustrates a flow diagram showing one example 900 of controlling UAV 104 to automatically obtain machine-specific information of a mobile machine operating in a worksite area. Operation 900 includes a mechanism that allows UAV 104 to collect information from machines 108, positioned across a worksite area 106, and upload the collected information to remote systems 120 for analysis automatically.

At block 902, automated UAV data collection logic 388 detects a request to obtain machine-specific information from a mobile machine operating in a worksite area. Automated UAV data collection logic 388 can detect a request for obtaining such information at regularly scheduled intervals, for example, or in response to a determination that an operation is initiated or completed, for example, or in other ways.

At block 904, machine data collection logic 395 generates a UAV flight path that controls UAV 104 to target particular machines 108 and obtain information from those particular machines 108. More specifically, machine data collection logic 395 can generate instructions that control UAV 104 (e.g., by interfacing with flight path interface logic 318) to travel along a defined flight path, where the flight path is defined to allow UAV 104 to hover above each machine 108, within a certain distance, to establish a communication connection (e.g., over a WiFi connection, near field communication connection, etc.). The established communication connection can allow UAV 104 to obtain machine-specific information. Machine data collection logic 395 can thus identify particular machines 108 by a unique identifier, and interface with flight path interface logic 318 to direct travel of UAV 104 to each identified machine.

At block 906, machine data collection logic 394 detects that UAV 104 collected machine specific data associated with the mobile machines 108 targeted in accordance with block 904.

At block 908, communication station upload logic 396 generates a UAV flight path that controls UAV 104 to travel to communication station 110. In one example, communication station upload logic 396 generates the UAV flight path based on machine data collection logic 394 detecting that UAV 104 has collected the machine specific data. That is, once machine specific data is obtained, communication station upload logic 396 generates instructions that control UAV 104 (e.g., by interfacing with flight path interface logic 318) to travel along a defined flight path, where the flight path is defined to allow UAV 104 to hover above communication station 110, within a certain distance, to establish a communication connection (e.g., over a WiFi connection, near field communication connection, etc.).

At block 910, communication station upload logic 396 controls an uploading operation that instructs UAV 104 to upload the obtained machine-specific information, among other information (such as imagery information obtained by image capture component 122) to communication station 110 (e.g. to a satellite communication station remote from UAV 104) via the established communication connection (e.g., satellite communication connection). For example, where communication station 110 is positioned remotely from machines 108, UAV 104 is instructed, by communication station upload logic 396, to travel from a location near machine 108 to a location near communication station 110 such that communication station 110 can receive the information captured by UAV 104 over the connection established between UAV 104 and communication station 110.

At block 912, communication station upload logic 396 detects that UAV 104 has uploaded the information to communication station 110.

At block 914, data forwarding logic 398 automatically forwards the uploaded, machine specific data and other information to a forestry analysis system. In one example, data forwarding logic 398 can automatically forward the information based on communication station upload logic 396 detecting that the information was uploaded from UAV 104. Data forwarding logic 398 can forward the information to, for example, a remote forestry analysis system via a communication connection (e.g., satellite connection that allows communication between communications station 110 and a remote, cloud computing service executing some or all of forestry analysis system 116).

At block 916, data forwarding logic 398 generates a data forward output indicative of the information being automatically forwarded to and stored by forestry analysis system 116. At block 918, data forwarding logic 398 outputs an indication of the data forward output. For example, data forwarding logic 398 can provide an indication of the data forward output to UAV 104, such that UAV 104 is released to perform other data collection and upload operations or other operations. In one example, data forwarding logic 398 provides an indication of the data forward output being performed to operator 112, such as via user interface component 246 and/or user interface device 204.

At block 920, automated UAV data collection logic 388 provides remote systems 120 with access to the information uploaded to forestry analysis system 116. For example, automated UAV data collection logic 388 can generate instructions that allow remote systems 120 to access and use the data uploaded to forestry analysis system 116 according to the automated collection and upload operation 900.

Figure 10:
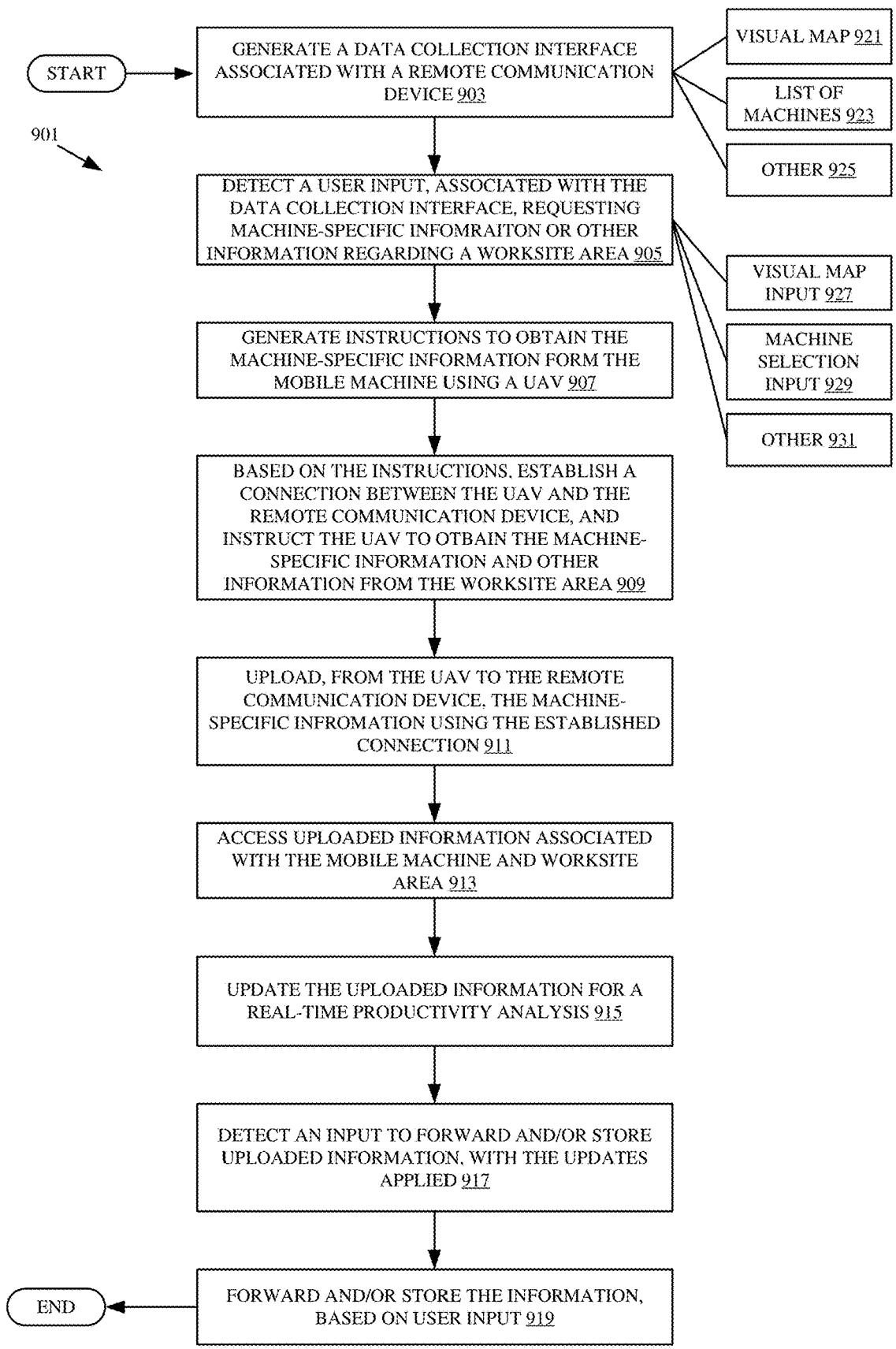
FIG. 10 illustrates a flow diagram showing one example of controlling a UAV to obtain machine-specific information of a mobile machine operating in a worksite by using user input.

FIG. 10 illustrates a flow diagram showing one example 901 of controlling a UAV to obtain machine-specific information of a mobile machine operating in a worksite based on a user input. At block 903, communication device connectivity logic 301 generates a data collection interface that can be displayed or otherwise provided to communication device 114. Communication device connectivity logic 301 can generate instructions that control communication device 114 to display a representation of a visual map 921, a list 923 of available mobile machines 108, and a wide variety of other interfaces 925 that display other information that can be used by operator 112 to select parameters for collecting and uploading relevant information about worksite area 106.

At block 905, communication device connectivity logic 301 detects a user input, for example associated with the interface generated, that requests machine specific information or other information regarding worksite area 106. For example, communication device connectivity logic 301 can detect a user input received with a visual map representation 927 (e.g., selecting location for UAV system 104 to travel to), detect a user input received to select a particular machine 929 (e.g., the user input selects a machine from a list of available machines 108 operating in worksite area 106), and detect a wide variety of other inputs 931 that initiate a data collection and upload operation.

At block 907, machine data targeting logic 303 generates a UAV flight path that controls UAV 104 to target particular machines 108 and obtain information from those particular machines. Machine data targeting logic 303 can generate a UAV flight path according to any of the features described with respect to block 908 of FIG. 9 (e.g., machine data collection logic 394).

At block 909, communication device connectivity logic 301 establishes a communication connection between UAV 104 and communication device 114. Communication device connectivity logic 301 can instruct UAV 104 to, via the established communication connection, obtain machine specific information and other information from worksite area 106. For instance, communication device connectivity logic 301 can establish a WiFi connection between communication device 114 and UAV 104, and transfer the flight path instructions generated by machine data targeting logic 303 to UAV 104. Based on the operator input that selects particular machines 108 and/or locations of worksite area 106, operator 112 can thus utilize partial-assist UAV data collection logic 390 to instruct UAV system 104 to collect specific information.

At block 911, communication device connectivity logic 301 uploads data obtained by UAV 104 to communication device 114 using the established connection. That is, once UAV 104 has traveled along the flight path and captured relevant information, communication device connectivity logic 301 instructs UAV 104 to report back to a location in worksite area 106 that is near communication device 114, and accordingly upload the captured information to communication device 114.

At block 913, real time productivity interface logic 305 accesses some of the information uploaded to communication device 114 and associated with mobile machine 108 and/or worksite area 106. That is, real time productivity interface logic 305 selects particular uploaded information that can be utilized in updating a productivity status for an operation being performed at worksite area 106.

At block 915, real time productivity interface logic 307 updates the uploaded information for providing a real time productivity update. For example, where UAV 104 captured machine specific information that indicates a number of hours that machine 108 has been harvesting in worksite area 106, real time productivity interface logic 307 can update a current productivity measure, based on this captured information, and provide an indication of the updated productivity measure to operator 112 using communication device 114. As such, in accordance with block 915, operator 112 can receive updates to a productivity measure of an operation for worksite area 106 as information is obtained from UAV system 104 and uploaded to communication device 114, in real time.

At block 917, data storage and forward logic 307 detects an input to forward and/or store the uploaded information, with the updates applied. For instance, communication device 114 provides an interface that allows operator 112 to provide a user input to select a storage location, such as a remote storage location at forestry analysis system 116 or local location at communication device 114. At block 919, data storage and forward logic 307 generates instructions that forward and/store the information according to the user input. That is, at block 919, data storage and forward logic 307 generates instructions that forward the information from communication device 114 to forestry analysis system 116, or otherwise store the information at communication device 114 for further control locally with operator 112 interaction.

It is noted that while forestry harvesting machines have been particularly discussed with respect to the examples described herein, other machines can also be implemented with said examples, and thus the present disclosure is not limited to use of the systems and processes discussed with merely forestry harvesting machines.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
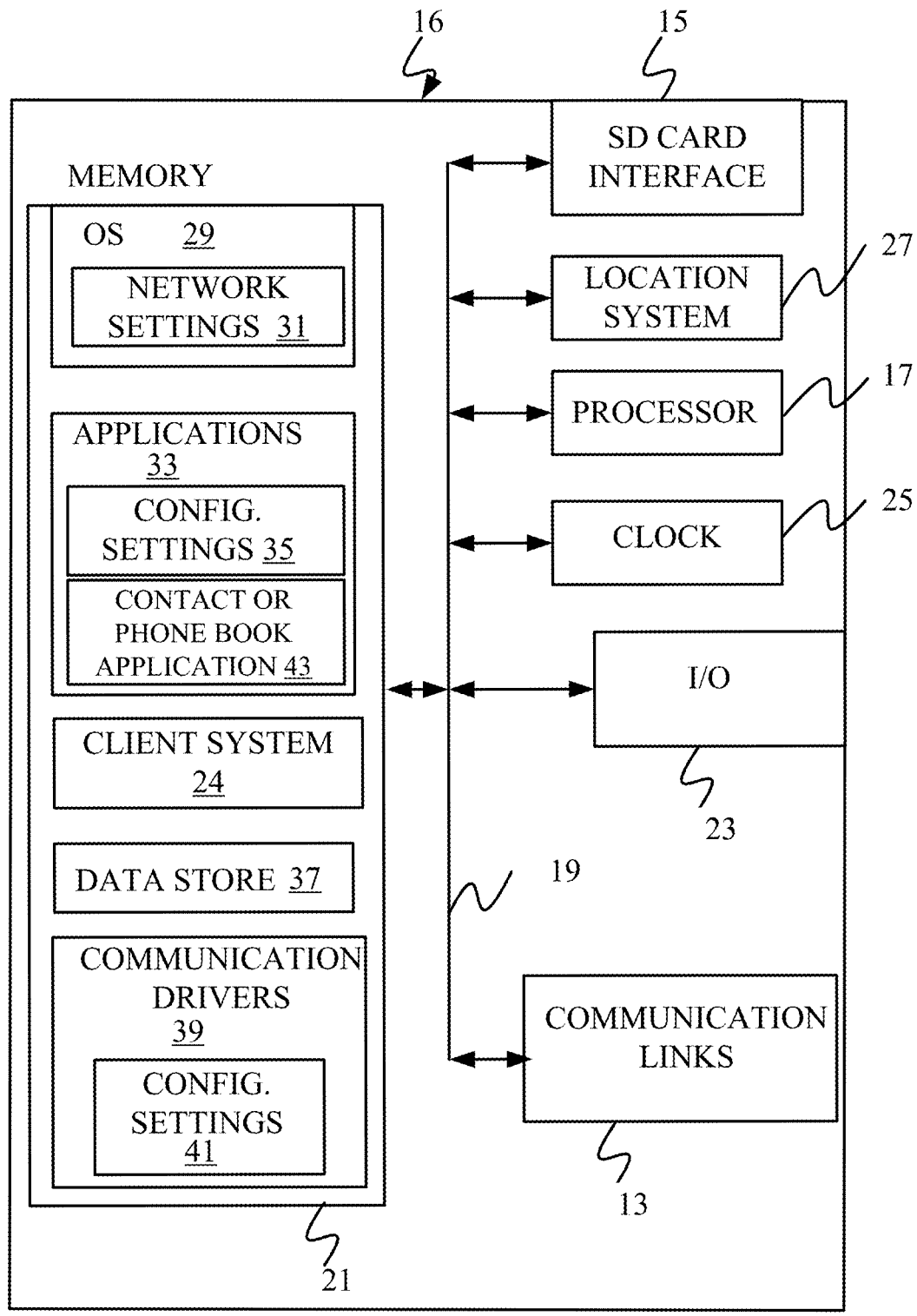
FIGS. 11-13 show examples of mobile devices that can be used in the architectures shown in the previous figures.
Figure 12:
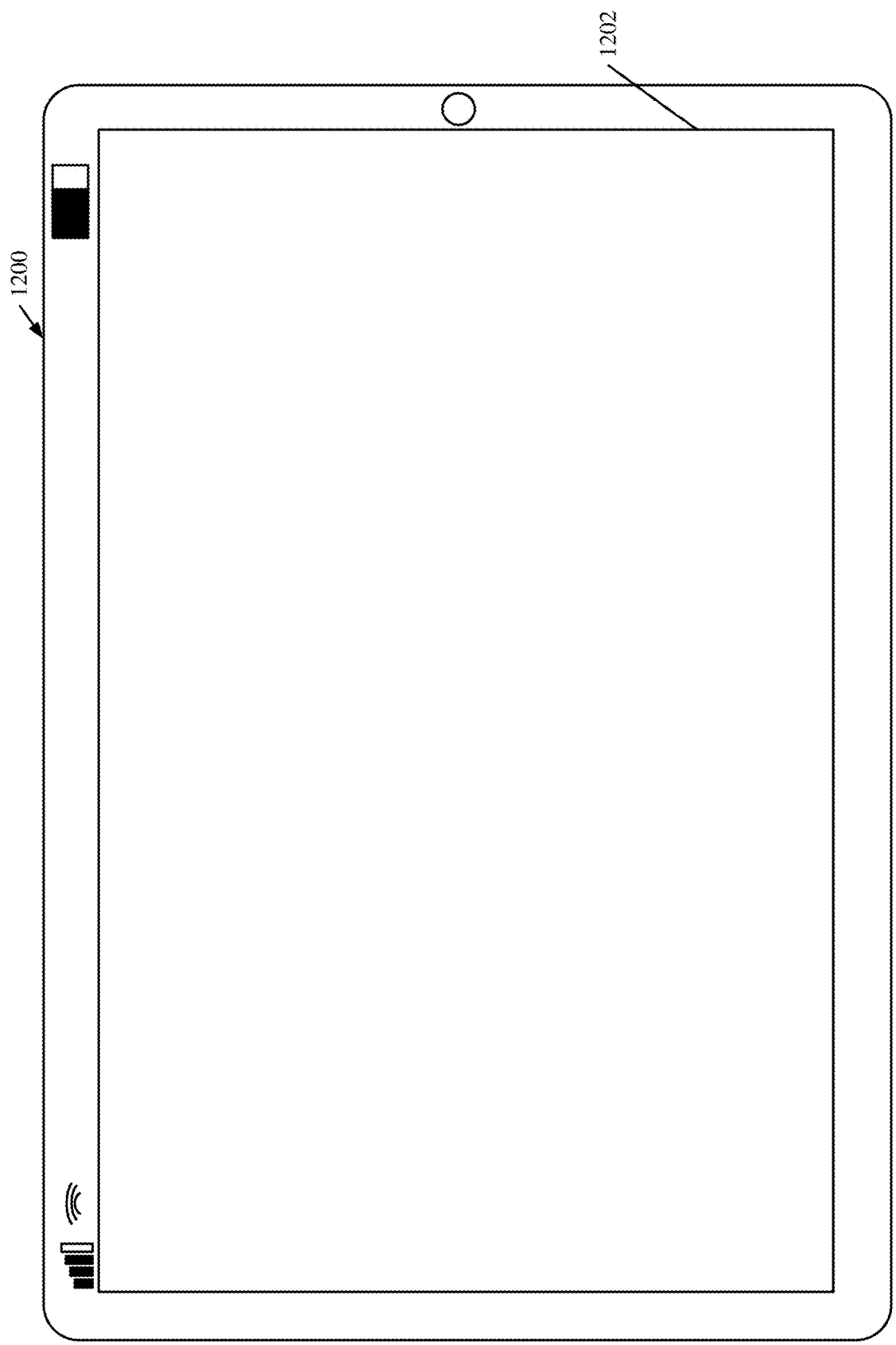
Figure 13:
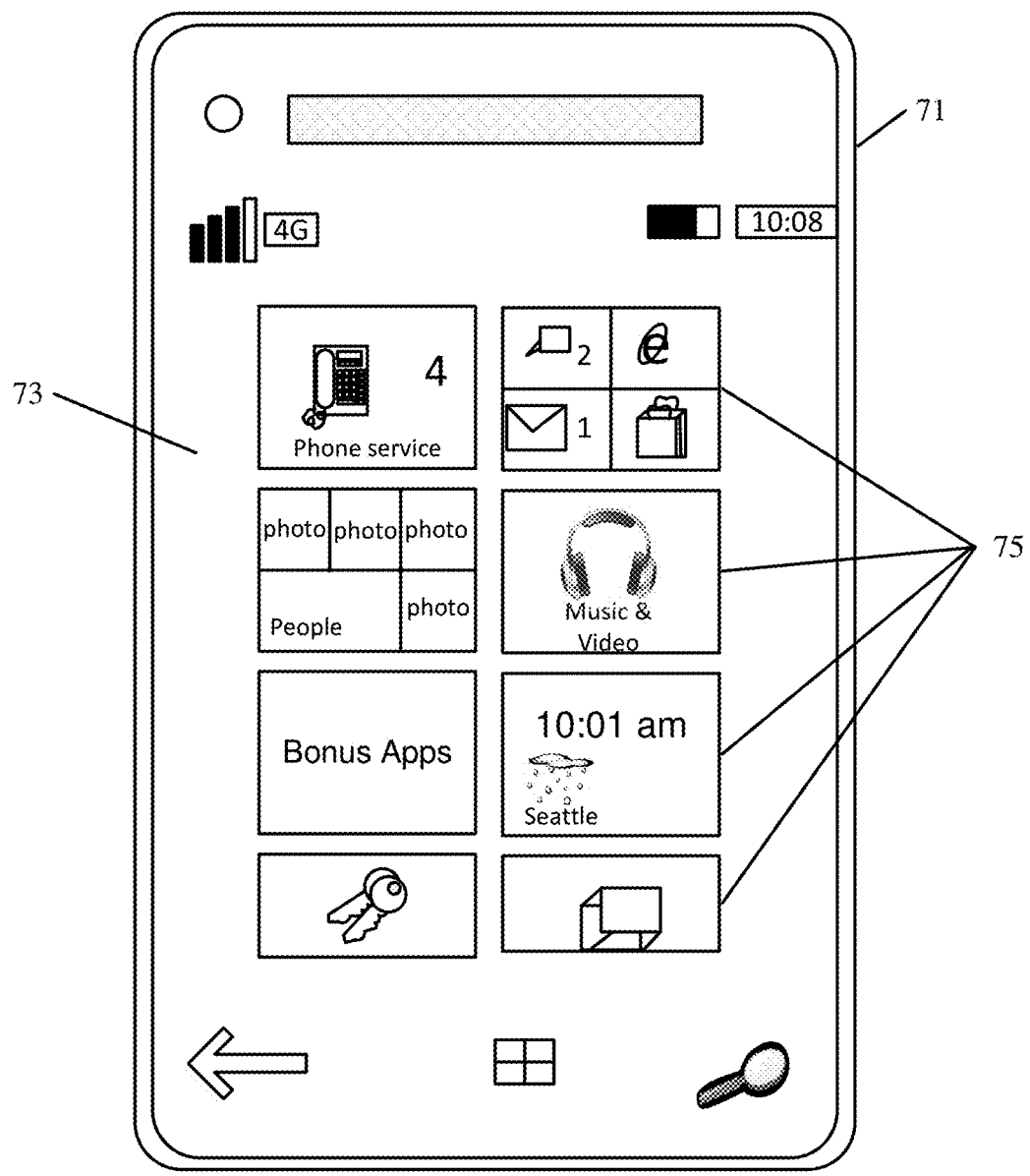

FIG. 11 is a simplified block diagram of one illustrative example of a handheld or mobile computing device that can be used as a user's or client's hand held device 16, in which the present system (or parts of it) can be deployed. For instance, a mobile device can be deployed as computing architecture 200 in the operator compartment of machine 108 or for use in generating, processing, or displaying the information discussed herein and in generating a control interface. FIGS. 12-13 are examples of handheld or mobile devices.

FIG. 11 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 700. In FIG. 12, computer 1200 is shown with user interface display screen 1202. Screen 1202 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 700 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
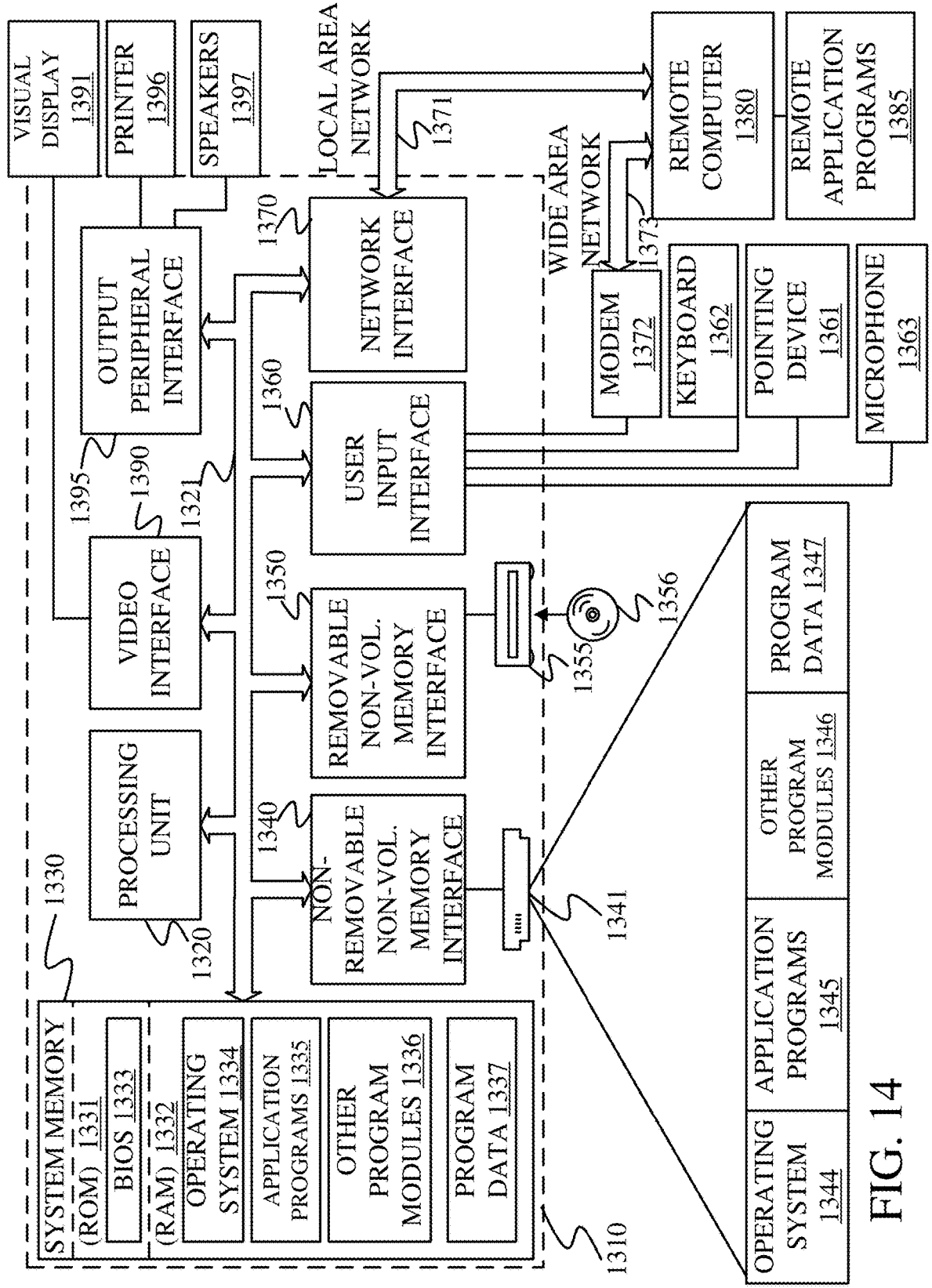
FIG. 14 is a block diagram showing one example of a computing environment that can be used in the architectures shown in the previous figures.

FIG. 14 is one example of a computing environment in which elements of FIG. 2, or parts of it, (for example) can be deployed. With reference to FIG. 14, an example system for implementing some embodiments includes a general-purpose computing device in the form of a computer 1310. Components of computer 1310 may include, but are not limited to, a processing unit 1320 (which can comprise processors or servers from previous FIGS.), a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. Memory and programs described with respect to FIG. 2 can be deployed in corresponding portions of FIG. 14.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 10 illustrates operating system 1334, application programs 1335, other program modules 1336, and program data 1337.

The computer 1310 may also include other removable/non-removable volatile/nonvolatile computer storage media. By way of example only, FIG. 14 illustrates a hard disk drive 1341 that reads from or writes to non-removable, nonvolatile magnetic media, an optical disk drive 1355, and non-volatile optical disk 1356. The hard disk drive 1341 is typically connected to the system bus 1321 through a non-removable memory interface such as interface 1340, and optical disk drive 1355 are typically connected to the system bus 1321 by a removable memory interface, such as interface 1350.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 1310. In FIG. 14, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite dish, scanner, or the like. These and other input devices are often connected to the processing unit 1320 through a user input interface 1360 that is coupled to the system bus, but may be connected by other interface and bus structures. A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections (such as a local area network—LAN, or wide area network WAN) to one or more remote computers, such as a remote computer 1380.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. In a networked environment, program modules may be stored in a remote memory storage device. FIG. 14 illustrates, for example, that remote application programs 1385 can reside on remote computer 1380.

It should also be noted that the different examples described herein can be combined in different ways. That is, parts of one or more examples can be combined with parts of one or more other examples. All of this is contemplated herein.

Example 1 is a computer-implemented method, comprising:
controlling an unmanned aerial vehicle to fly over a forestry worksite and capture imagery information with an image capture component;
generating a set of ground disturbance metrics, each having a value indicative of a measure of ground disturbance at a different geographic location in the forestry worksite, based on the imagery information; and generating an action signal based on the values of the ground disturbance metrics in the set.

Example 2 is the computer-implemented method of any or all previous examples wherein generating a set of ground disturbance metrics comprises:
identifying, from the imagery information, a given geographic location that has a ground disturbance indicator indicative of likely ground disturbance; and
identifying, as the value of the ground disturbance metric, a level of disturbance of the ground at the given geographic location, the disturbance of the ground being measured as a difference in a smoothness of the ground at the geographic location relative to a smoothness of the ground at other proximate geographic locations.

Example 3 is the computer-implemented method of any or all previous examples wherein generating an action signal comprises:

comparing the value of the ground disturbance metric at the given geographic location to a threshold ground disturbance value.

Example 4 is the computer-implemented method of any or all previous examples wherein an action signal comprises:
if the value of the ground disturbance metric at the given geographic location exceeds the threshold ground disturbance value, then generating an action signal identifying the given geographic location as a ground disturbance location for which corrective action is to be taken.

Example 5 is the computer-implemented method of any or all previous examples wherein generating an action signal comprises:
identifying a type of ground disturbance at the ground disturbance location based on the imagery information.

Example 6 is the computer-implemented method of any or all previous examples wherein generating an action signal comprises:
selecting a corrective action to address the ground disturbance at the ground disturbance location, based on the type of ground disturbance at the ground disturbance location.

Example 7 is the computer-implemented method of any or all previous examples wherein selecting a corrective action comprises
identifying whether the corrective action can be performed by a machine at the forestry worksite.

Example 8 is the computer-implemented method of any or all previous examples wherein generating an action signal comprises:
generating a communication signal to the machine at the forestry worksite identifying the corrective action to take.

Example 9 is the computer-implemented method of any or all previous examples wherein generating the communication signal comprises:
identifying the ground disturbance location where the selected corrective action is to be performed by the machine at the forestry worksite.

Example 10 is a computer-implemented method, comprising:
controlling an unmanned aerial vehicle (UAV) to fly over a forestry worksite and capture imagery information with an image capture component;
generating a set of slope metrics, each having a value indicative of a measure of slope at a different geographic location in the forestry worksite, based on the imagery information; and
generating an action signal based on the values of the slope metrics in the set.

Example 11 is the computer-implemented method of any or all previous examples wherein generating an action signal comprises:
generating a route signal indicative of a route for a forestry machine at the forestry worksite based on the slope metrics; and
controlling communication logic to communicate the route signal to the forestry machine.

Example 12 is the computer-implemented method of any or all previous examples wherein the imagery information comprises forest fire information indicative of a geographic location of a forest fire and wherein generating a route signal comprises:
generating a forest fire escape route signal indicative of a forest fire escape route for the forestry machine, based on the imagery information.

Example 13 is the computer-implemented method of any or all previous examples wherein controlling the UAV comprises:
sending a flight plan to the UAV, the flight plan being indicative of a route over the worksite that the UAV flies.

Example 14 is the computer-implemented method of any or all previous examples wherein the imagery information is indicative of treetops of trees at the forestry worksite and wherein generating a set of slope metrics comprises:
receiving the imagery information from the UAV; and
identifying treetop height of the treetops, at the different geographic locations, based on the imagery information.

Example 15 is the computer-implemented method of any or all previous examples wherein generating a set of slope metrics comprises:
generating the set of slope metrics based on changes in treetop height of treetops at the different geographic locations.

Example 16 is the computer-implemented method of any or all previous examples wherein the imagery information is indicative of ground altitude at the forestry worksite and wherein generating a set of slope metrics comprises:
receiving the imagery information from the UAV; and
generating the set of slope metrics based on changes in ground altitude at the different geographic locations.

Example 17 is a computer-implemented method, comprising:
controlling an unmanned aerial vehicle (UAV) to fly over a forest site and capture site information with an image capture component;
receiving the site information from the UAV;
generating a firefighting metric, indicative of a terrain characteristic at the forest site, based on the site information;
generating a feasibility metric indicative of a feasibility of performing a firefighting operation at the forest site based on the terrain characteristic; and
generating an action signal based on a value of the firefighting metric.

Example 18 is the computer-implemented method of any or all previous examples wherein generating an action signal comprises:
generating an escape route signal indicative of a firefighting escape route from the forest site, based on a determination that the firefighting operation is to be performed, given the feasibility metric.

Example 19 is the computer-implemented method of any or all previous examples wherein generating a firefighting metric comprises:
generating a pest infestation metric indicative of a level of pest infestation at the forest site, based on the site information.

Example 20 is the computer-implemented method of any or all previous examples wherein generating a firefighting metric comprises:
generating at least one of a slope metric indicative of a terrain slope at the forest site, or a tree condition metric indicative of a condition of trees at the forest site.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
controlling an unmanned aerial vehicle to fly over a forestry worksite and capture imagery information with an image capture component;
generating a set of soil disturbance metrics, each having a value indicative of a measure of a machine-induced soil disturbance at a different geographic location in the forestry worksite, based on the imagery information; and
generating an action signal based on the values of the soil disturbance metrics in the set.

2. The computer-implemented method of claim 1 wherein generating a set of soil disturbance metrics comprises:
identifying, from the imagery information, a given geographic location that has a soil disturbance indicator indicative of likely soil disturbance; and
identifying, as the value of the soil disturbance metric, a level of disturbance of the soil at the given geographic location, the disturbance of the soil being measured as a difference in a surface smoothness of the soil at the geographic location relative to a surface smoothness of the soil at other proximate geographic locations.

3. The computer-implemented method of claim 2 wherein generating an action signal comprises:
comparing the value of the soil disturbance metric at the given geographic location to a threshold soil disturbance value.

4. The computer-implemented method of claim 3 wherein an action signal comprises:
if the value of the soil disturbance metric at the given geographic location exceeds the threshold soil disturbance value, then generating an action signal identifying the given geographic location as a soil disturbance location for which corrective action is to be taken.

5. The computer-implemented method of claim 4 wherein generating an action signal comprises:
identifying a type of soil disturbance at the soil disturbance location based on the imagery information.

6. The computer-implemented method of claim 5 wherein generating an action signal comprises:
selecting a corrective action to address the soil disturbance at the soil disturbance location, based on the type of soil disturbance at the soil disturbance location.

7. The computer-implemented method of claim 6 wherein selecting a corrective action comprises:
identifying a machine at the forestry worksite that can perform the corrective action.

8. The computer-implemented method of claim 7 wherein generating an action signal comprises:
generating a communication signal to the identified machine at the forestry worksite identifying the corrective action to take.

9. The computer-implemented method of claim 8 wherein generating the communication signal comprises:
identifying the soil disturbance location where the selected corrective action is to be performed by the identified machine at the forestry worksite.

10. A computer-implemented method comprising:
controlling an unmanned aerial vehicle to fly over a forestry worksite, after a machine has operated on the worksite, and obtain sensor information indicative of a condition of the worksite;
generating a set of soil disturbance metrics, each having a value indicative of a measure of soil disturbance at a different geographic location in the forestry worksite, based on the sensor information; and
generating an action signal based on the values of the soil disturbance metrics in the set.

11. The computer-implemented method of claim 10, wherein the condition comprises a topography of the worksite.

12. The computer-implemented method of claim 11, wherein generating a set of soil disturbance metrics comprises:
identifying, from the sensor information, a given geographic location that has a soil disturbance indicator indicative of likely soil disturbance; and
identifying, as the value of the soil disturbance metric, a level of disturbance of the soil at the given geographic location, the disturbance of the soil being measured as a difference in a height of the soil at the given geographic location relative to a height of the soil at other proximate geographic locations.

13. The computer-implemented method of claim 12, wherein generating an action signal comprises:
comparing the value of the soil disturbance metric at the given geographic location to a threshold soil disturbance value, wherein the threshold soil disturbance value comprises a level of acceptable soil height deviation across the worksite.

14. The computer-implemented method of claim 13, wherein an action signal comprises:
identifying, if the soil disturbance metric exceeds the threshold soil disturbance level, the given geographic location as a soil disturbance location for Which corrective action is to be taken.

15. The computer-implemented method of claim 14, wherein generating an action signal comprises:
identifying a type of soil disturbance at the soil disturbance location based on the sensor information; and
determining if the soil disturbance is machine induced.

16. The computer-implemented method of claim 15, wherein generating an action signal comprises:
if the soil disturbance is machine induced, then selecting a corrective action to address the soil disturbance at the soil disturbance location.

17. The computer-implemented method of claim 16, wherein selecting a corrective action comprises:
identifying a machine at the worksite that can perform the corrective action.

18. The computer-implemented method of claim 17, wherein generating an action signal comprises:
generating a communication signal to the identified machine at the worksite indicating the corrective action to take.

19. The computer-implemented method of claim 18, wherein generating the communication signal comprises:
identifying the soil disturbance location where the selected corrective action is to be performed.

20. A computer-implemented method comprising:
receiving a request to perform a soil disturbance assessment of a forestry worksite;
generating a flight path for an unmanned aerial vehicle based on the request;
controlling the unmanned aerial vehicle to fly over the forestry worksite and capture imagery information with an image capture component based on the flight path;
generating a map of the forestry worksite having a measured level of soil disturbance based on the imagery information;
identifying a threshold value of soil disturbance;
comparing the measured value of soil disturbance to the threshold value of soil disturbance;

detecting a level of soil disturbance beyond the threshold value of soil disturbance;
identifying a particular sub-area of the forestry worksite that requires repair;
determining a corrective action to repair the particular sub-area of the forestry worksite;
identifying a mobile machine within the worksite capable of carrying out the corrective action;
generating an action signal indicative of the corrective action to the identified mobile machine; and
updating the map of the forestry worksite.

* * * * *